(12) United States Patent
Shah et al.

(10) Patent No.: US 11,419,700 B2
(45) Date of Patent: Aug. 23, 2022

(54) METHODS AND SYSTEMS FOR LOCATING MARKS ON ORTHODONTIC APPLIANCES

(71) Applicant: Ormco Corporation, Orange, CA (US)

(72) Inventors: Mithil J. Shah, North Hills, CA (US); Yevgeniy Sirovskiy, Castro Valley, CA (US); Wayne R. Murphy, Orange, CA (US); Gopal Biswas, Maharashtra (IN)

(73) Assignee: Ormco Corporation, Orange, CA (US)

( * ) Notice: Subject to any disclaimer, the term of this patent is extended or adjusted under 35 U.S.C. 154(b) by 824 days.

(21) Appl. No.: 16/362,118

(22) Filed: Mar. 22, 2019

(65) Prior Publication Data

US 2020/0297457 A1    Sep. 24, 2020

(51) Int. Cl.

| | |
|---|---|
| *B41M 5/26* | (2006.01) |
| *A61C 7/00* | (2006.01) |
| *A61C 7/08* | (2006.01) |
| *B33Y 80/00* | (2015.01) |
| *A61C 9/00* | (2006.01) |

(Continued)

(52) U.S. Cl.
CPC ............... *A61C 7/002* (2013.01); *A61C 7/08* (2013.01); *B41M 5/267* (2013.01); *A61C 9/0053* (2013.01); *A61C 13/0004* (2013.01); *A61C 13/34* (2013.01); *B29C 2037/80* (2013.01); *B33Y 80/00* (2014.12)

(58) Field of Classification Search
CPC ..... A61C 7/08; A61C 7/002; A61C 2204/005; A61C 7/146; A61C 9/0053; A61C 13/0004; A61C 19/04; A61C 7/02; A61C 13/34; A61C 2201/002
See application file for complete search history.

(56) References Cited

U.S. PATENT DOCUMENTS

| | | | |
|---|---|---|---|
| 6,165,406 A | 12/2000 | Jang et al. | |
| 7,840,373 B2 | 11/2010 | Culp et al. | |
| 2014/0315153 A1* | 10/2014 | Kitching | B29C 33/3842 433/213 |

FOREIGN PATENT DOCUMENTS

| | | |
|---|---|---|
| EP | 3620131 A1 | 3/2020 |
| WO | 2018174843 A1 | 9/2018 |
| WO | 2018187434 A1 | 10/2018 |

OTHER PUBLICATIONS

PCT Office, International Preliminary Report on Patentability issued in PCT/US2020/023831 dated Sep. 28, 2021.

(Continued)

*Primary Examiner* — Jason L Vaughan
*Assistant Examiner* — Amanda Kreiling
(74) *Attorney, Agent, or Firm* — Wood Herron & Evans LLP

(57) ABSTRACT

A computer-implemented method for marking an object on an aligner. The aligner surface is modeled. The method includes calculating a normal for each tile in a tessellated surface and disqualifying a tile from being selected. For tiles not disqualified, a patch is identified that produces a markable area. The method includes selecting an object to be marked, calculating a location of the object in the markable area, and providing the location of the object to a marking device. Disqualifying includes comparing an angle between a normal and an orientation of the beam to an origin of the calculated normal on each tile. Disqualifying includes disqualifying the at least one tile when the angle is outside of a range of −90° to +90°. Identifying the patch includes separating the patch into at least two smaller patches, and one of the two smaller patches of tiles is the markable area.

20 Claims, 25 Drawing Sheets

(51) Int. Cl.
    *A61C 13/00* (2006.01)
    *A61C 13/34* (2006.01)
    *B29C 37/00* (2006.01)

(56) References Cited

OTHER PUBLICATIONS

PCT Office, International Search Report and Written Opinion issued in PCT/US2020/023831 dated May 19, 2020, 12 pages.

* cited by examiner

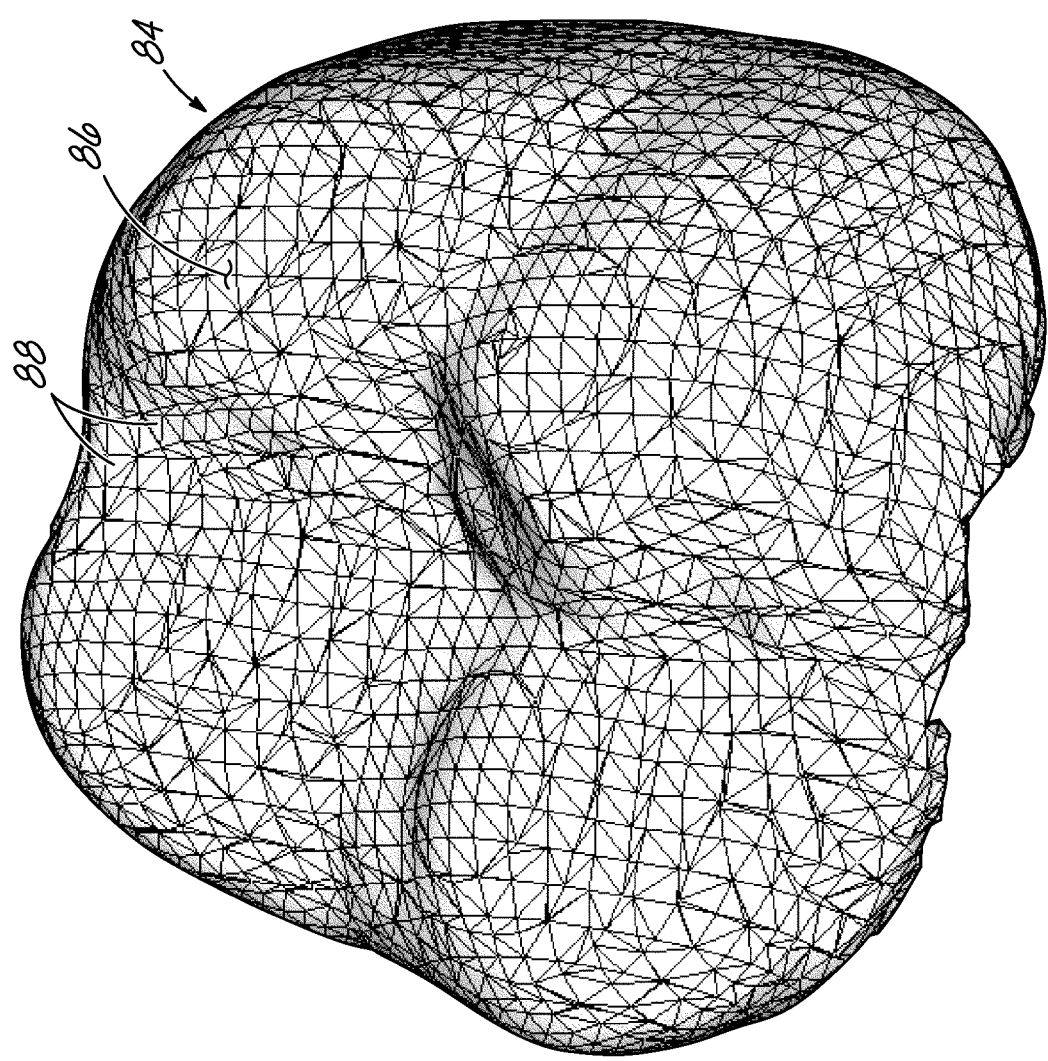

METHODS AND SYSTEMS FOR LOCATING MARKS ON ORTHODONTIC APPLIANCES

TECHNICAL FIELD

The present invention relates generally to the field of orthodontic treatment and, more particularly, to systems and methods of manufacturing orthodontic appliances including locating marks on the orthodontic appliances.

BACKGROUND

Orthodontics is the practice of manipulating teeth to correct malocclusions between the teeth of the upper and lower dental arches. Typically, treatment of malocclusions includes the use of an orthodontic appliance that applies corrective forces to the teeth. Over time, these corrective forces coerce the teeth to move into their orthodontically correct positions.

One way of applying corrective forces is with orthodontic appliances referred to as "dental aligners," or simply "aligners." Aligners are supplied as a series of removable appliances that incrementally reposition the patient's teeth from their initial orientation to their orthodontically correct orientation. Patients being treated with aligners can insert and remove the aligners at will. When one aligner has moved the teeth to at or near a final orientation for that aligner, the patient merely begins using the next aligner in the series according to a treatment plan, which is prescribed by a clinician.

To fabricate aligners, the clinician first obtains a computer model of the patient's dentition. This model may be generated from data by taking an impression of the dentition and scanning the impression into a computer. Alternatively, the data may be generated by directly scanning the patient's teeth with an intraoral scanner. In either case, the scanned data is then used to construct the computer model of the patient's dentition.

Once the computer model has been obtained, the orthodontist may manipulate individual teeth in the computer model to determine a final orientation of each tooth that provides a corrected dentition. Multiple computer models may then be generated, with each model corresponding to an incremental orientation of the dentition from an initial orientation to a target orientation. The incremental orientations from initial to target orientations may be designed to move the patient's teeth according to a treatment plan. Treatment plans typically include numerous stages of movement from an initial orientation to a target orientation. Depending on the degree of tooth movement, treatment plans may include a series of aligners that are worn in a predetermined sequence to move teeth from the initial orientation to the target orientation with the last aligner moving the patient's teeth to the final orientation.

Once the design of the series of aligners is complete, the series of aligners is fabricated. Manufacturing each aligner in the series typically involves forming a plastic sheet onto a mold constructed of a target orientation of the dentition according to the computer models. After forming, waste material must be trimmed away to produce the aligner. Trimming may utilize CNC milling or another computer controlled cutting system.

Because orthodontic treatment may require a series of aligners to be used in a specific order, manufacturers often mark each aligner with unique information. That information may then allow the manufacturer, clinician, and the patient to more easily differentiate each individual aligner in a plurality of aligners from one another. In the event that the aligners are disordered, the manufacturer, the clinician, or the patient may more easily determine the proper order by reviewing the mark. This facilitates proper orthodontic treatment.

Marking aligners is not without its challenges. The irregular surface of each aligner presents problems for mark placement as it relates to legibility. Further, no two aligners are the same. Because many surfaces on the aligner are small and uneven, marking the aligner in a manner that provides coherent, legible information is difficult.

While marking aligners has been generally successful, there remain problems with selecting a location to be marked and marking aligners in an efficient manner while producing a consistently legible mark. Thus, improved methods, systems, and computer program products are needed in the marking of aligners.

SUMMARY OF THE INVENTION

The present invention overcomes the foregoing and other shortcomings and drawbacks of selection and marking of aligners. While the invention will be described in connection with certain embodiments, it will be understood that the invention is not limited to these embodiments. On the contrary, the invention includes all alternatives, modifications and equivalents as may be included within the spirit and scope of the present invention.

According to one aspect of the present invention, there is a computer-implemented method for marking an object on a surface of an aligner with a marking device. The surface of the aligner is modeled by a virtual, tessellated surface. The method comprises calculating a normal for each of a plurality of tiles in the tessellated surface and disqualifying at least one tile from being selected for marking. Disqualifying includes comparing the calculated normal for each of the plurality of tiles with orientations reachable with the marking device. For tiles not disqualified, the method includes identifying a patch of tiles that produces a markable area, selecting an object to be marked, calculating a location of the object in the markable area, and providing the location of the object to the marking device.

In one embodiment, the marking device is configured to generate a beam and disqualifying includes comparing an angle between each calculated normal and an orientation of the beam from the marking device to an origin of the calculated normal on each tile.

In one embodiment, disqualifying includes disqualifying the at least one tile when the angle is outside of a range of −90° to +90°.

In one embodiment, identifying the patch of tiles includes separating the patch of tiles into at least two smaller patches of tiles, and one of the at least two smaller patches of tiles is the markable area.

In one embodiment, separating includes identifying a first tile in the patch and a second tile in the patch, the first tile and the second tile touching only at a vertex, and after separating, the first tile is included in one of the at least two smaller patches and the second tile is included in another of the at least two smaller patches.

In one embodiment, identifying includes overlapping a rectangular grid consisting of a plurality of cells on the markable area and identifying each cell that is at least 60% overlapped with tiles not disqualified. In one embodiment, the markable area includes the cells that are at least 80% overlapped with tiles not disqualified.

In one embodiment, selecting the object includes selecting the object from a predetermined prioritized list of objects to be marked.

In one embodiment, the prioritized list of objects includes a stage number and during selecting, the stage number is the first object selected for marking.

In one embodiment, the predetermined prioritized list of objects includes a stage number, a case number, an arch location, a logo, and a type.

In one embodiment, each of the stage number, the case number, and the logo consist of multiple objects each to be marked.

In one embodiment, the method further includes redirecting the laser beam to account for a different position of each object of the multiple objects in the markable area on the aligner and marking the object on the markable area.

In one embodiment, during identifying the patch, no tiles are identified so that at least one of the arch location, the logo, and the type are not marked on the aligner.

In one embodiment, prior to calculating the normal, the method further includes inflating a virtual model of a patient's teeth to provide the virtual, tessellated surface.

In one embodiment, the method further includes fitting the object in the markable area, wherein fitting includes evaluating an overlap between the object and the markable area.

In one embodiment, fitting includes aligning a center of the object with a center of the markable area.

In one embodiment, after aligning, the method further includes shifting the object in a plane of the grid away from the center of the markable area until the object overlaps at least one disqualified tile.

According to one aspect of the present invention, there is a system for marking an object on an aligner with a marking device that produces a beam. The aligner is modeled with a virtual, tessellated surface. The system comprises a processor; and a memory including program code. The processor is configured by the program code to calculate a normal for each of a plurality of tiles in the tessellated surface and disqualify at least one tile from being marked by comparing the calculated normal for each of the plurality of tiles with orientations reachable with the marking device. For tiles not disqualified, the processor is configured by the program code to identify a patch of tiles that produces a markable area, select an object to be marked, calculate a location of the object in the markable area, and provide the location of the object to the marking device.

In one embodiment, the system further comprises the marking device.

In one embodiment, the processor is configured by the program code to compare an angle between each calculated normal and an orientation of the beam from the marking device to an origin of the calculated normal on each tile.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

FIGS. 4A, 4B, and 4C are mesh models according to embodiments of the invention.

DETAILED DESCRIPTION

Figure 1:
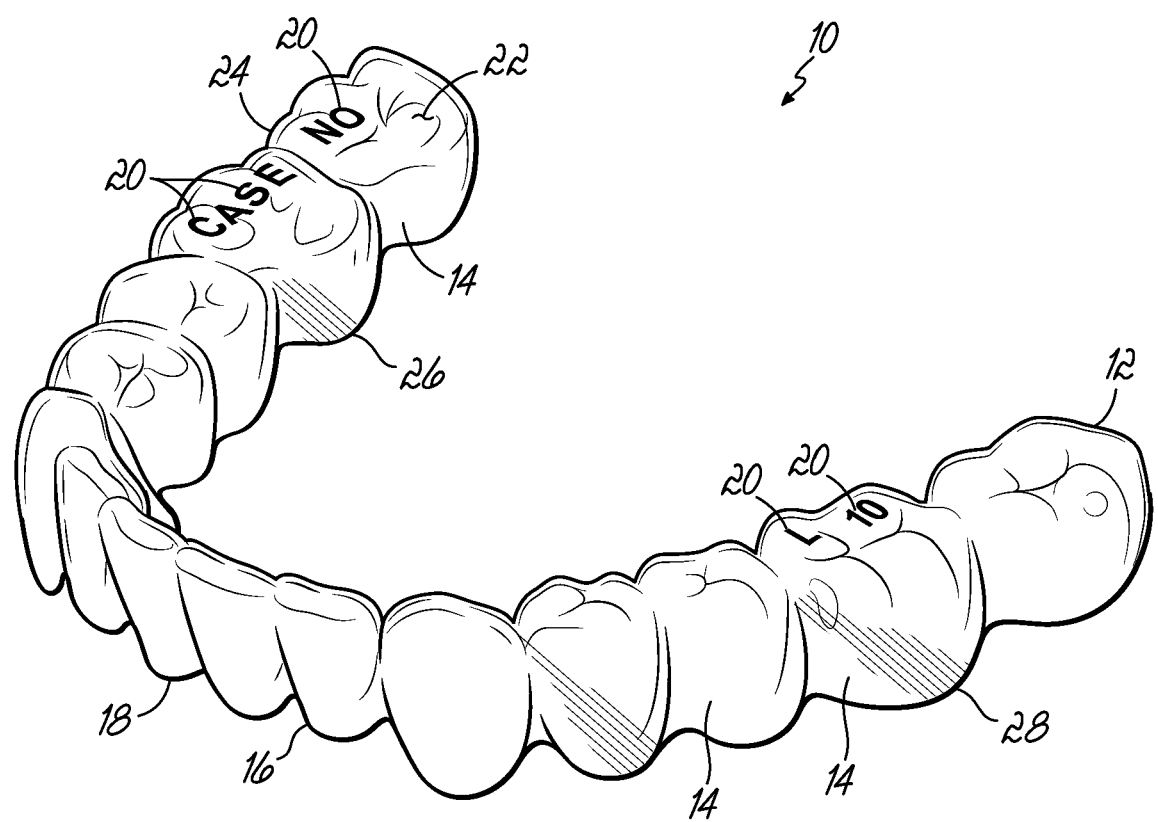
FIG. 1 is a perspective view of an aligner in accordance with one embodiment of the present invention.

Embodiments of the invention are directed to aligners and methods and systems for fabricating aligners including locating an object to be marked on a surface of an aligner and marking the object on the aligner. Advantageously, embodiments of the invention improve mark quality by consistently producing a legible mark on the surface of the aligner. This is achieved by locating and then selecting an optimum surface on each aligner to receive a mark. Because each aligner is unique, no two aligners may have the same optimum surfaces at the same location. Further, the methods described herein are capable of producing high-quality marks on aligners with different hardware. That is, in one embodiment of the method of locating optimum marking locations and assigning a mark to a pre-identified location are hardware independent. Consistently high-quality marks on aligners facilitates identification of each unique aligner and ultimately improves the efficiency of orthodontic treatment.

To those and other ends, the methods and systems disclosed are utilized to select a surface location on each aligner for marking. Aligners have uneven and irregular surfaces because their outer surfaces nearly mimic an underlying occlusal surface of the patient's tooth. Embodiments of the invention enable selection of markable areas on a surface of each aligner by taking into account the known surface irregularities. That selection is optimized for a particular mark on a per-aligner basis. Markable areas are those that may be oriented in a range of reachable orientations with respect to a marking device. For those orientations, a legible mark may be produced on the aligner.

The object to be marked on the aligner is selected from a list of objects to be marked. The objects on the list are in a predetermined order of priority. When a markable area is available, the aligner is marked with the highest priority object. The aligner may be marked with lower priority objects depending upon the availability of markable areas for those objects.

The system marks the highest-priority object on the selected aligner surface. To do so, the system makes relative positional adjustments between the marking device and the aligner to optimize the relative orientation between the two. The marking device is oriented to optimize focus and accuracy of a beam at its point of impingement in the selected markable surface by changing the angular relationship between the aligner and the marking device. Marking in these areas with an optimized orientation enables the mark to be legible. Advantageously, surfaces that may not have been markable in one relative orientation may be made to be markable by reorienting the marking device to improve an angle of impingement with the surface.

Marking the aligner may be achieved through the use of a laser, though other marking devices may include inkjet printers, machining systems, and non-laser light sources, to name only a few. The type of marking device determines if the object is marked in or on the region selected. For example, lasers may etch the surface by removing material or changing material properties at the surface. In this case, the object is marked in the surface. In contrast, inkjet printers may place material, i.e. ink, on the surface. Embodiments of the invention are not intended to be limited to marking in or on the surface and that terminology is used interchangeably and without limitation herein.

To these and other ends, and referring to FIG. 1, a dental aligner 10 includes a hollow shell 12 that is configured to encapsulate one or more crowns of a patient's teeth. The shell 12 is formed with a plurality of cavities 14 that collectively define an edge 16. The edge 16 defines an opening 18 in the shell 12. Each cavity 14 is shaped to receive a specific one of the patient's teeth through the opening 18. In one embodiment, the shell 12 may be an elastic material in one or more layers. One or more objects 20, which provide identification information for the aligner 10 and/or the patient, may be located on the shell 12. As shown, the objects 20 may be located on an outward-facing surface of the aligner.

In the exemplary embodiment shown, the objects 20 are located on an occlusal surface 22 of the cavities 24, 26, and 28 that are configured to receive a respective one of the patient's molars. While the objects 20 in FIG. 1 are visible, embodiments of the invention include objects 20 that may blend in with the aligner 10 when positioned on the patient's teeth. Thus, one or more of the objects 20 may not be readily visible during use or be easily seen during handling and prior to use. For the manufacturer, the clinician, and the patient to see the object 20, it may be necessary to position the aligner 10 in front of a dark background to increase the contrast between the object 20 and the shell 12.

During orthodontic treatment, the dental aligner 10 is selectively positionable over the patient's teeth and may fit tightly at least partly due to slight differences in the position of one or more of the cavities 14 relative to the corresponding tooth. A set of aligners (not shown) may include one or more dental aligners 10 (FIG. 1). Each of the aligners in the set may differ slightly so that they each provide slightly different movement of the teeth. Cumulatively, the individual movements that result from each aligner 10 may result in complete treatment of the patient's malocclusion.

Figure 2:
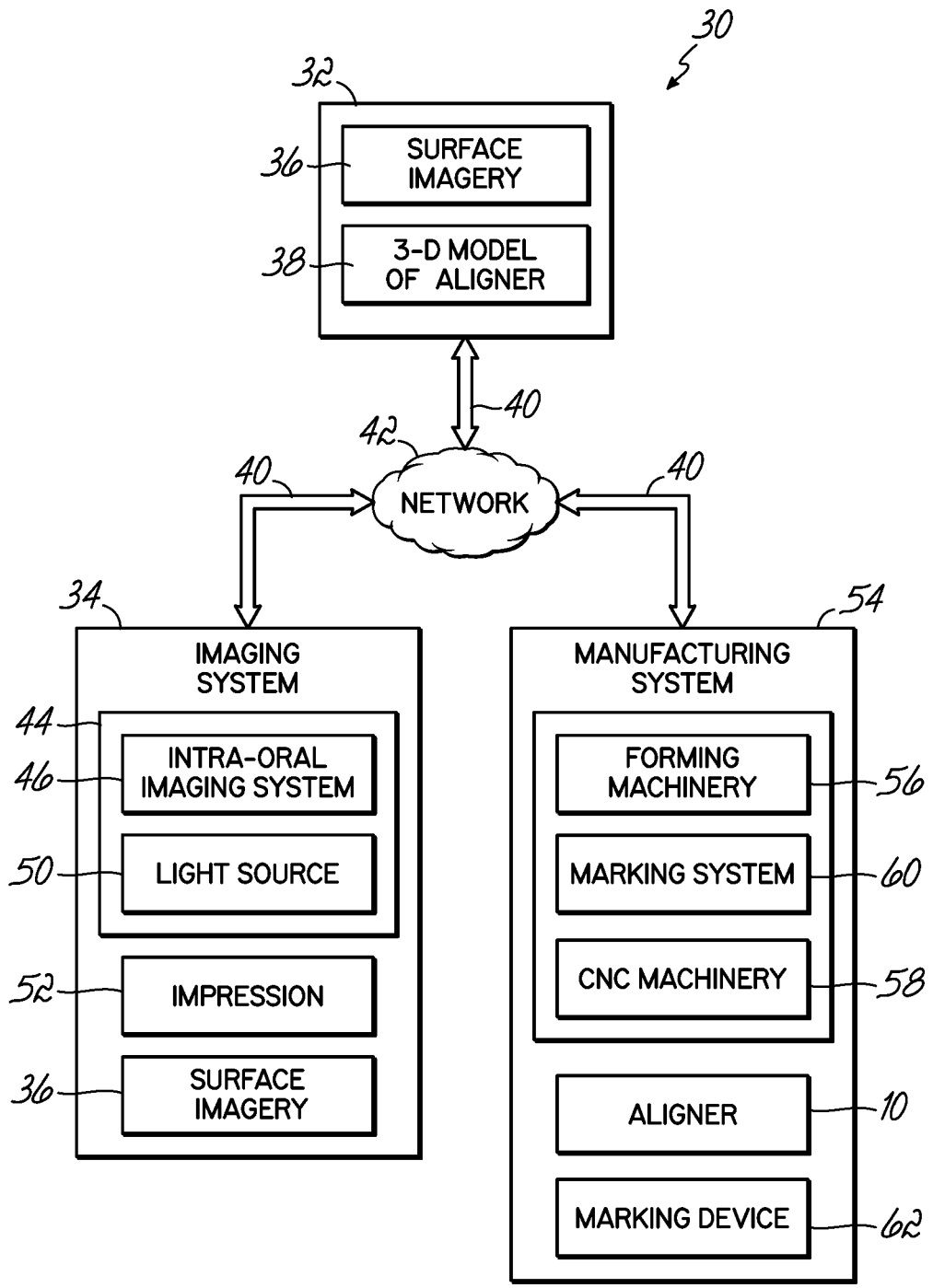
FIG. 2 is a diagram illustrating an exemplary system in accordance with one embodiment.

In an exemplary embodiment and with reference to FIG. 2, a system 30 for marking the aligner 10 may include a computer 32, an imaging system 34, and a manufacturing system 54. The computer 32 may receive multiple imageries from imaging system 34 and/or another imaging system. Imagery may include surface imagery 36 of one or more of the patient's teeth. A clinician may utilize the computer 32 to prepare an orthodontic treatment plan based on a 3-D model of the patient's teeth constructed from the surface imagery 36. The 3-D model of the patient's teeth may then be manipulated in a manner to construct a 3-D model 38 for each of the aligners 10. The computer 32 may include any suitable computational device, such as a personal computer, a server computer, a mini computer, a mainframe computer, a blade computer, a tablet computer, a touchscreen computing device, a telephonic device, a cell phone, a mobile computational device, dental equipment having a processor, etc.

In certain embodiments, the computer 32 may provide web services or cloud computing services. More than one computer may also be used for storing data or performing the operations performed by the computer 32 in accordance with the embodiments of the invention. In the embodiment shown, while not being limited to any particular network, the computer 32 is operatively coupled via one or more wired or wireless connections 40 to one or both of the imaging system 34 and the manufacturing system 54 over a network 42. The network 42 may comprise a local area network, the Internet, an intranet, a storage area network, or any other suitable network.

With continued reference to FIG. 2, the exemplary imaging system 34 may include a wand 44 having an imaging sensor 46 and a light source 50. The imaging sensor 46 may be an intra-oral camera that captures information regarding the oral cavity of the patient when exposed to light, for example, from the light source 50. The practitioner may insert at least a portion of the wand 44 into the patient's mouth. Using the light source 50 and the imaging sensor 46, the practitioner captures data of all or selected crowns of the patient's teeth to produce surface imagery 36. That data is used to prepare virtual models, described below, of the scanned teeth. Alternatively, surface imagery 36 may be produced by scanning an impression 52 of the patient's teeth.

Figure 3:
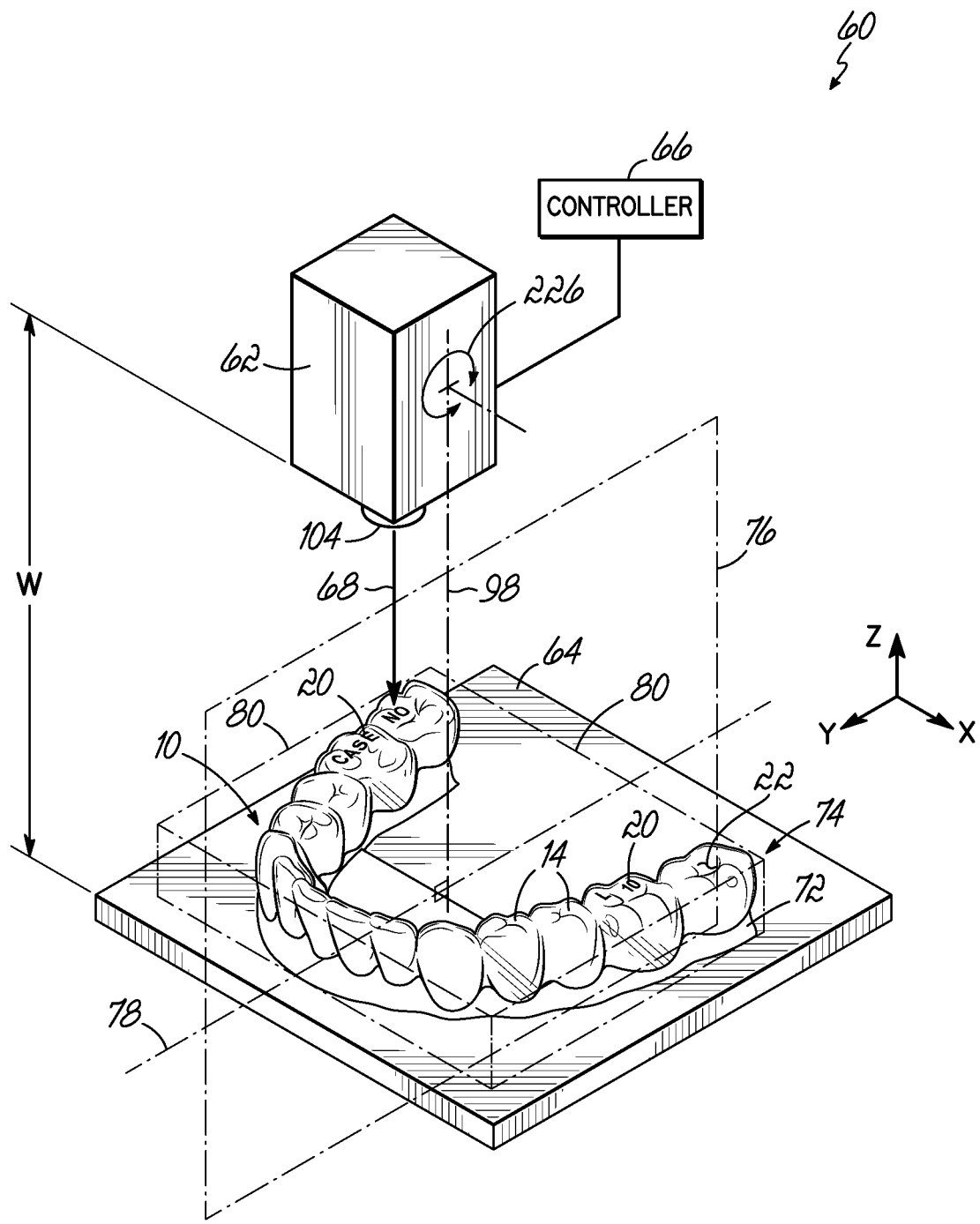
FIG. 3 is a schematic view of an exemplary marking system in accordance with one embodiment.
Figure 3A:
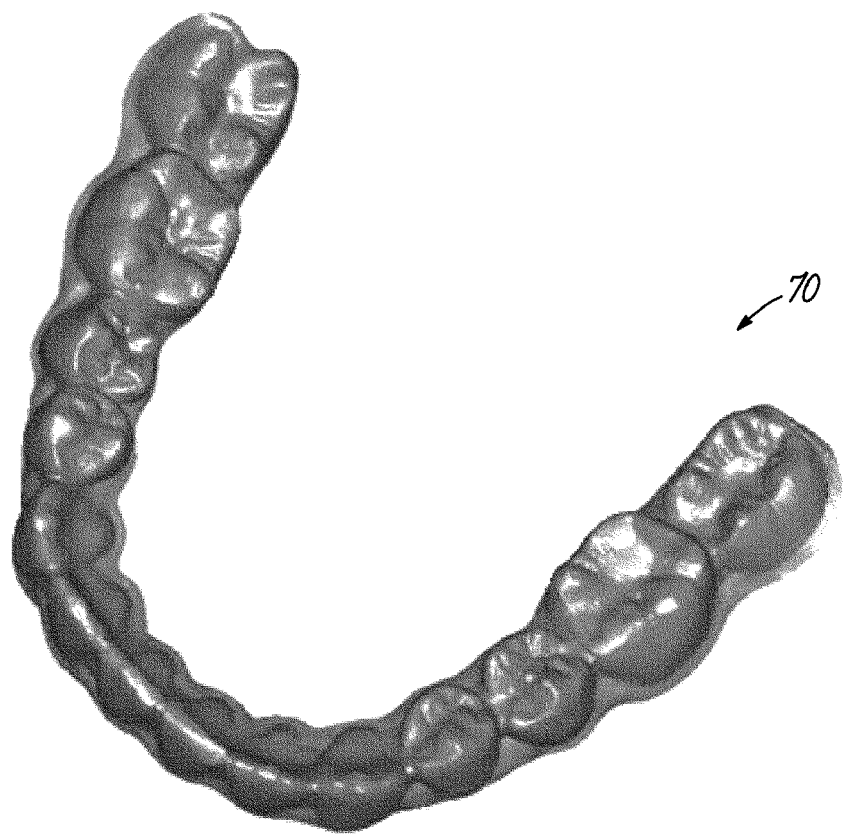
FIG. 3A is a perspective view of a pre-mold according to one embodiment of the invention.
Figure 3B:
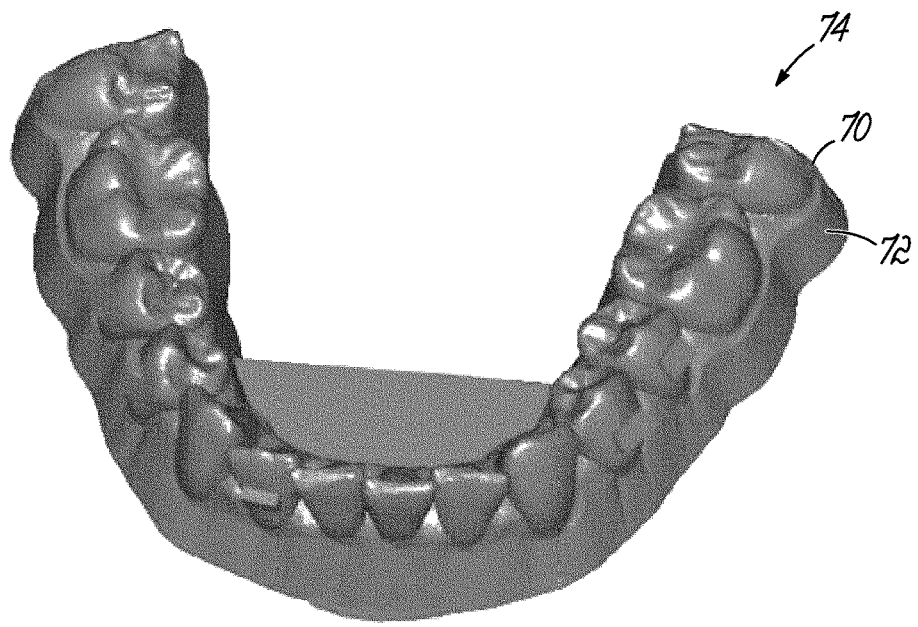
FIG. 3B is a perspective view of a mold according to one embodiment of the invention.

The manufacturing system 54 produces each aligner 10 in accordance with the 3-D model 38 of the aligner 10. To that end, the manufacturing system 54 may include both forming machinery 56 and CNC machinery 58. The system 30 also includes a marking system 60. With reference to FIG. 3, the marking system 60 may include a marking device 62, such as a laser, that may be in a fixed position relative to a stage 64. A laser beam 68 is steerable by one or more movable mirrors (not shown) to focus the laser beam 68 on an aligner 10 positioned on the stage 64. In one embodiment, the marking device 62 may be movable and/or may be articulated, i.e., rotatable, to orientations that cause impingement of the laser beam 68 at non-orthogonal angles to the stage 64. A controller 66 in communication with the system 30 controls operation of the laser 62 and may communicate with the manufacturing system 54. The laser beam 68 marks the aligner 10 with the object 20. Although the marking system 60 is shown as a portion of the manufacturing system 54, the marking system 60 may be separate from the manufacturing system 54. Further in that regard, while the system 30 is shown as separate systems in electrical communication through a network 42, embodiments of the invention are not limited to separate systems. A single system may include each of the computer 32, imaging system 34, and the manufacturing system 54. Furthermore, each of these systems may be at a single physical location and operated by one entity or be at separate physical locations and be operated by different entities but in communication with each other via the network 42.

According to embodiments of the invention, the physical space of the marking system 60 in which the laser 62 and the stage 64 reside is defined. With reference to FIG. 3, a working distance W spaces the laser 62 apart from the stage 64. During marking, the aligner 10 is positioned on the stage 64. Because the surface of the aligner 10 is calculable from the 3-D model 38, the distance from the laser 62 to the aligner 10 and the angular relationship between the laser beam 68 and all surfaces of the aligner 10 are known or are capable of being calculated. With these known relationships, once the system 30 identifies markable areas on the 3-D model 38, the system 60 may orient, focus, and raster the laser beam 68 to mark the corresponding markable area of the aligner 10 with the object 20. By this technique, methods and systems according to embodiments of the present invention mark objects 20 at preselected surfaces on the aligner 10 based on calculations made on the corresponding 3-D model 38. In this way, the object 20 is marked on the aligner 10 under optimum conditions.

With reference to FIGS. 2, 3, 3A, and 3B, the 3-D model 38 of the aligner 10 is related to a pre-mold 70 (best shown in FIG. 3A) of the patient's teeth. The pre-mold 70 is a physical model of the patient's teeth that may be manufactured from a virtual model prepared from the surface imagery 36 described above. Each aligner 10 is thermoformed over a corresponding mold 74 (FIG. 3B) that includes the pre-mold 70 on a base 72. Thus, to manufacture a plurality of aligners needed to move the patient's teeth from their initial positions to their final positions according to an orthodontic treatment plan, a plurality of pre-molds 70 (and molds 74) is also manufactured. Each pre-mold 70 is manufactured based on a virtual model (not shown) prepared from the surface imagery 36. Each pre-mold 70 represents a unique position of the patient's teeth during orthodontic treatment. According to embodiments of the invention, the 3-D model 38 of each aligner 10 is constructed from a virtual model of the pre-mold 70.

Referring now to FIG. 3, taking into account the physical space of the marking system 60, as is described above, the system 60 is capable of calculating orientations for the laser beam 62 to focus on the outwardly-facing surface of the aligner 10 based on the 3-D model 38 of the aligner 10, the working distance W, the dimensions of the mold 74, and the dimensions of the pre-mold 70. The surface of the aligner 10 when positioned on the pre-mold 70 may be defined with a coordinate system represented as a bounding box 80 including an alignment plane 76. The alignment plane 76 defines a y-axis 78 and is determined from a 3-D model of the mold 74. The alignment plane 76 may provide a plane of symmetry in the bounding box 80. When the pre-mold 70, the base 72, and the mold 74 are positioned on the stage 64 in alignment with the plane 76 or the axis 78, all points within the bounding box 80, including the surfaces of the aligner 10, may be determined. Thus, with data regarding optimal locations on the aligner 10 for a mark, the marking system 60 may optimize the orientation of the laser beam 68 so that optimum focus of the laser beam 68 on the corresponding surfaces of the aligner 10 is achieved. This maximizes the legibility of the object 20 on the aligner 10 (FIG. 1).

Figure 4A:
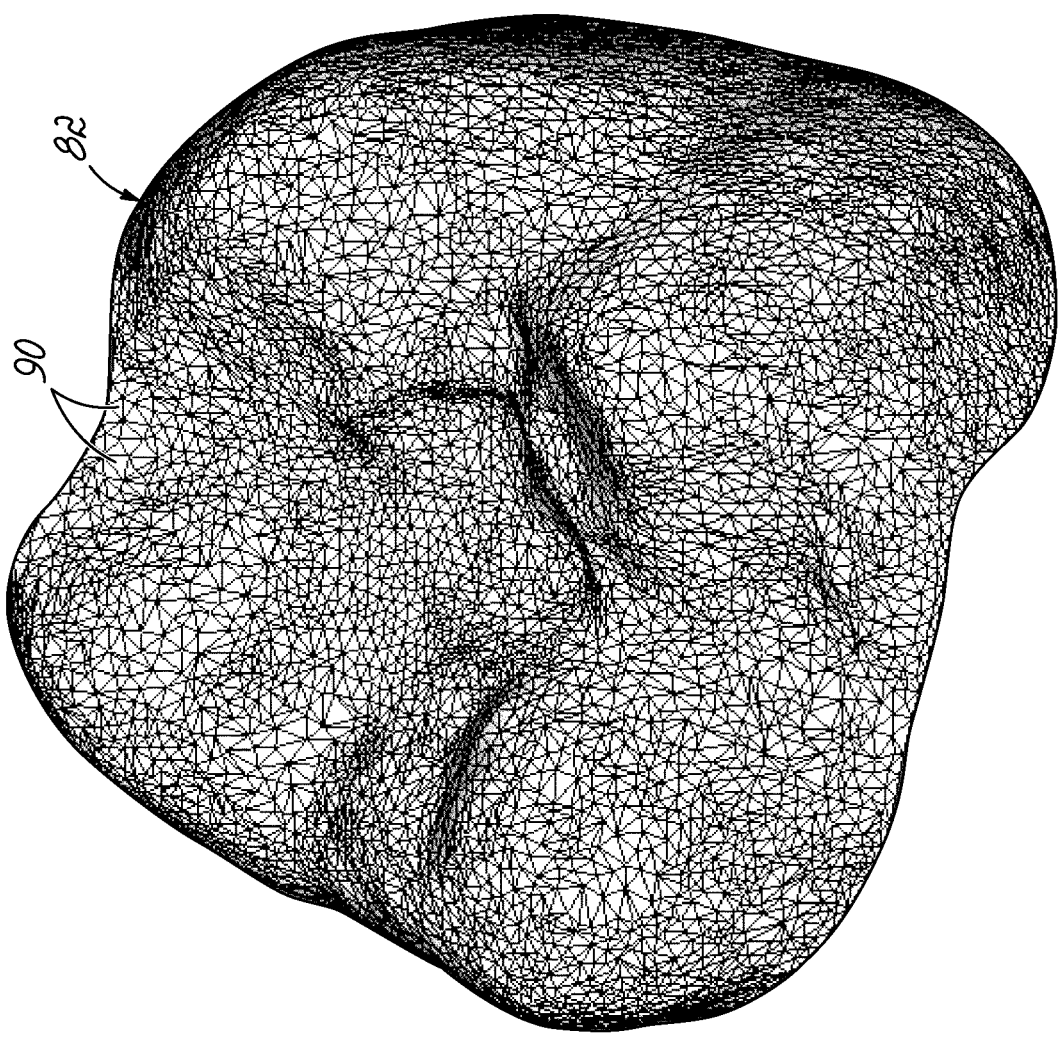
Figure 4C:
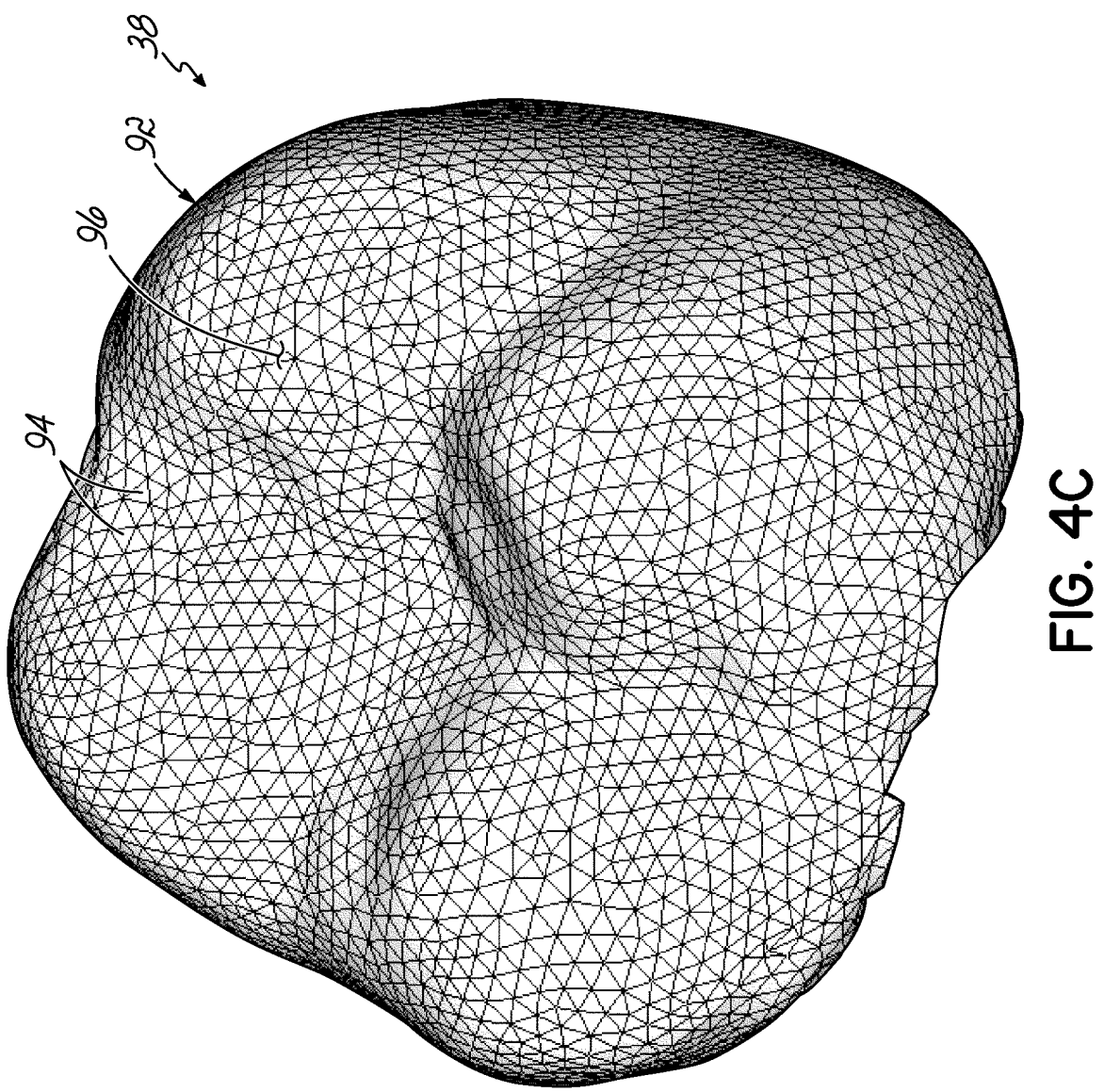

With regard to markable surfaces on the aligner 10 and to FIGS. 4A, 4B, and 4C, embodiments of the invention produce the 3-D model 38 from surface imagery 36. By way of example, the 3-D model 38 is constructed by inflating a triangular-mesh model 82 of the patient's teeth to account for the thickness of the aligner 10. The triangular-mesh model 82 may represent the virtual model of the pre-mold 70 and be constructed from the surface imagery 36. The triangular-mesh model 82 may be tessellated, for example, with a plurality of tiles 90, and each tile 90 may be in the form of a triangle (e.g., when using STL file format), though other 2-D geometric shapes may be utilized in the construction of the 3-D model 38.

Following inflation, an inflated model 84 is produced and is shown in FIG. 4B. The inflated model 84 may account for at least the estimated thickness of the aligner material relative to the corresponding triangular-mesh model 82. A surface 86 of the inflated model 84 is offset in a direction away from the surface defined by the triangular-mesh model 82. As compared to the triangular-mesh model 82, the surface 86 defined by the inflated model 84 is rounded and a plurality of tiles 88 that define the surface 86 are generally more uniform and of larger size than a plurality of tiles 90 defining the triangular-mesh model 82.

The inflated model 84 (FIG. 4B) may be remeshed to produce a remeshed model 92 shown in FIG. 4C. Similar to the inflated model 84 relative to the triangular-mesh model 82, during remeshing, the range of sizes and shapes of a plurality of tiles 94 may become more uniform relative to the inflated model 84. A surface 96 defined by the tiles 94 may be more rounded than the surface 86 of the inflated model 84. While only a single tooth location is shown with regard to each of the models 82, 84, and 92 in FIGS. 4A, 4B, and 4C, which correspond to a single molar location, the 3-D model 38 of the aligner 10 may be produced by inflating and remeshing a triangular-mesh model of the patient's arch, similar to that described above. Further, while the inflated model 84 and the remeshed model 92 are shown with the remeshed model 92 forming the 3-D model 38, the methods of constructing the 3-D model 38 may utilize any single one of the models 82 and 84, shown in FIGS. 4A, 4B, or 4C, respectively.

Moreover, after, during, or prior to inflating or remeshing, the surface imagery 36 or any of the models 82, 84, and 92 may be modified. For example, portions of the surface imagery 36 may be eliminated during the construction of the triangular-mesh model 82. In that regard, any data in the surface imagery 36 of the patient's gingiva may be removed following modeling of a trim line. The model crowns may be extracted after trim line placement to produce the triangular-mesh model 82.

Figure 5:
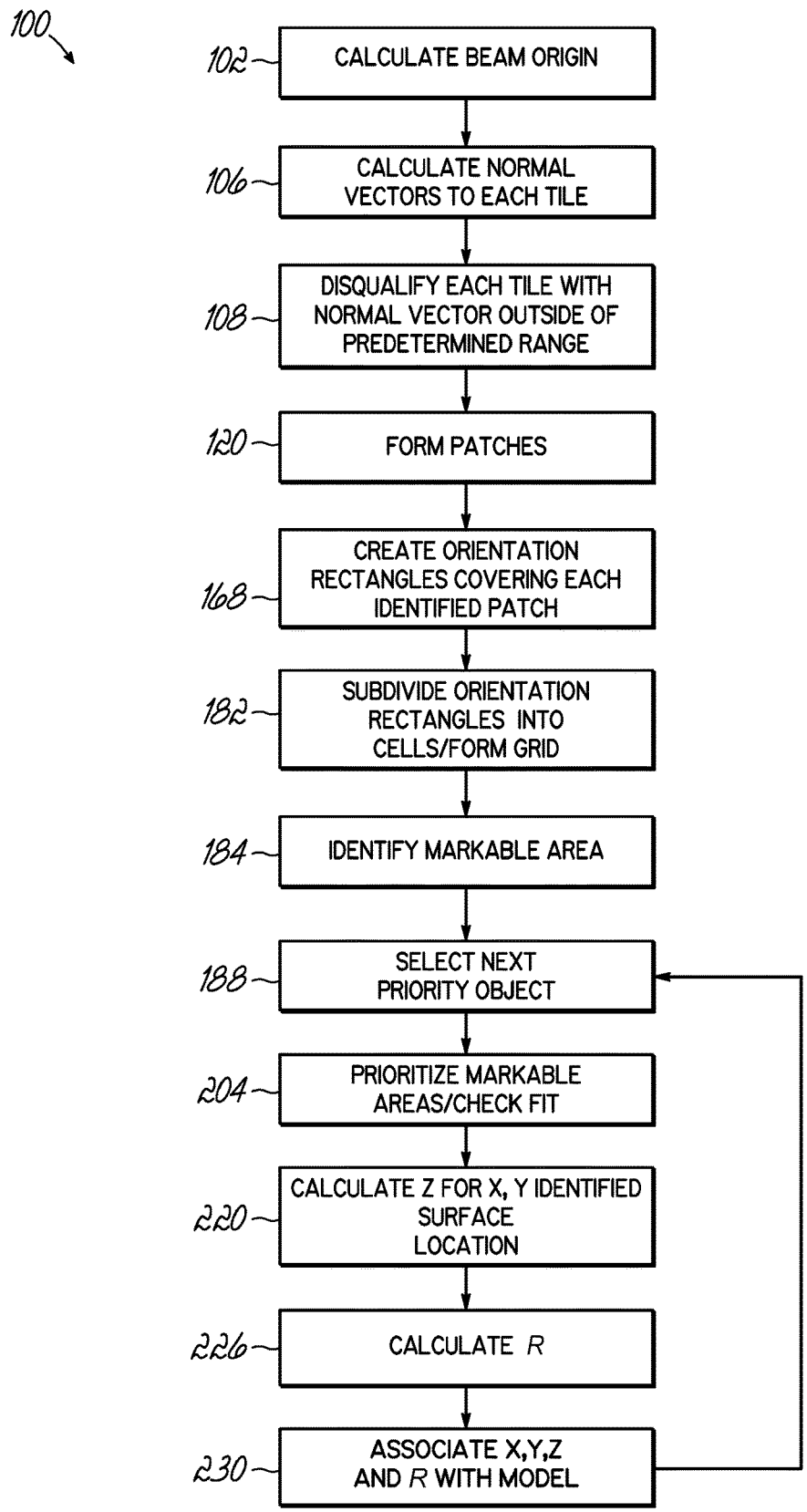
FIG. 5 is a flowchart according to one embodiment of the invention.

With reference to FIG. 5, an exemplary flowchart of a method 100 to be utilized by the system 30 is shown. In general, the method 100 identifies markable areas on the surface of the aligner 10 (FIG. 1) that are appropriate to receive the object 20. To that end, the method 100 identifies markable areas on the corresponding 3-D model 38 based on predetermined criteria including the physical parameters of the system 54, in particular the marking system 60; the material of the aligner 10; the orientation of the surfaces on the aligner 10 as determined from the 3-D model 38; and the characteristics of the object 20. Each object 20 may be a single letter, a number, or another typographic symbol or geometric shape (described below). The method 100 assesses the surface of each 3-D model 38 on a per-object basis to locate areas in which the object 20 may be most legible. As an example, where the object 20 is a character, such as the letter "A", an area large enough and reachable with the laser beam 68 for the "A" is identified.

Once identified, information on that area is included with data associated with the 3-D model 38. The marking system 60 may receive the data associated with object A, for example, and the identified area on the 3-D model 38. The system 60 moves the laser 62 to an angle and position so that the laser beam 68 can be focused on the surface of the aligner 10 that corresponds to the identified area on the 3-D model 38. The marking system 60 may then mark the A within the corresponding area on the aligner 10. A different area may be identified for the next-highest priority object 20. Advantageously, by addressing each object-area pair, the laser beam 68 can be focused specifically on that area on the aligner 10 to mark the object 20. This improves the accuracy and definition of the object 20 on the aligner 10. As a result, marking is more accurate, and the object 20 is better defined and is more legible on the aligner 10. The system 30 may then identify another area for the next object to be marked, and so on, until there are no more objects to be marked or there are no more markable areas available.

To that end, in one embodiment and with reference to FIG. 5, the method 100 at 102 determines a beam origin 104 (shown in FIG. 3). The beam origin 104 is a point in physical space of the marking system 60 at which the laser beam 68 originates and may be a known distance or a preset value that defines the working distance W, described above. Determining the beam origin 104 may include accounting for physical dimensions in the marking system 60, such as dimensions of the mold 74 and the bounding box 80. The beam origin 104 may be aligned with a center 98 of the bounding box 80. With those physical dimensions accounted for, once areas on the 3-D model 38 are determined and objects 20 are associated with those areas, a relative positional relationship may be described, for example, in terms of X, Y, and Z coordinates and angular beam orientation relative to the center of the bounding box 80 and relative to the surfaces of the aligner 10. That information is usable by the system 60 to position the laser 62 during marking.

Figure 6A:
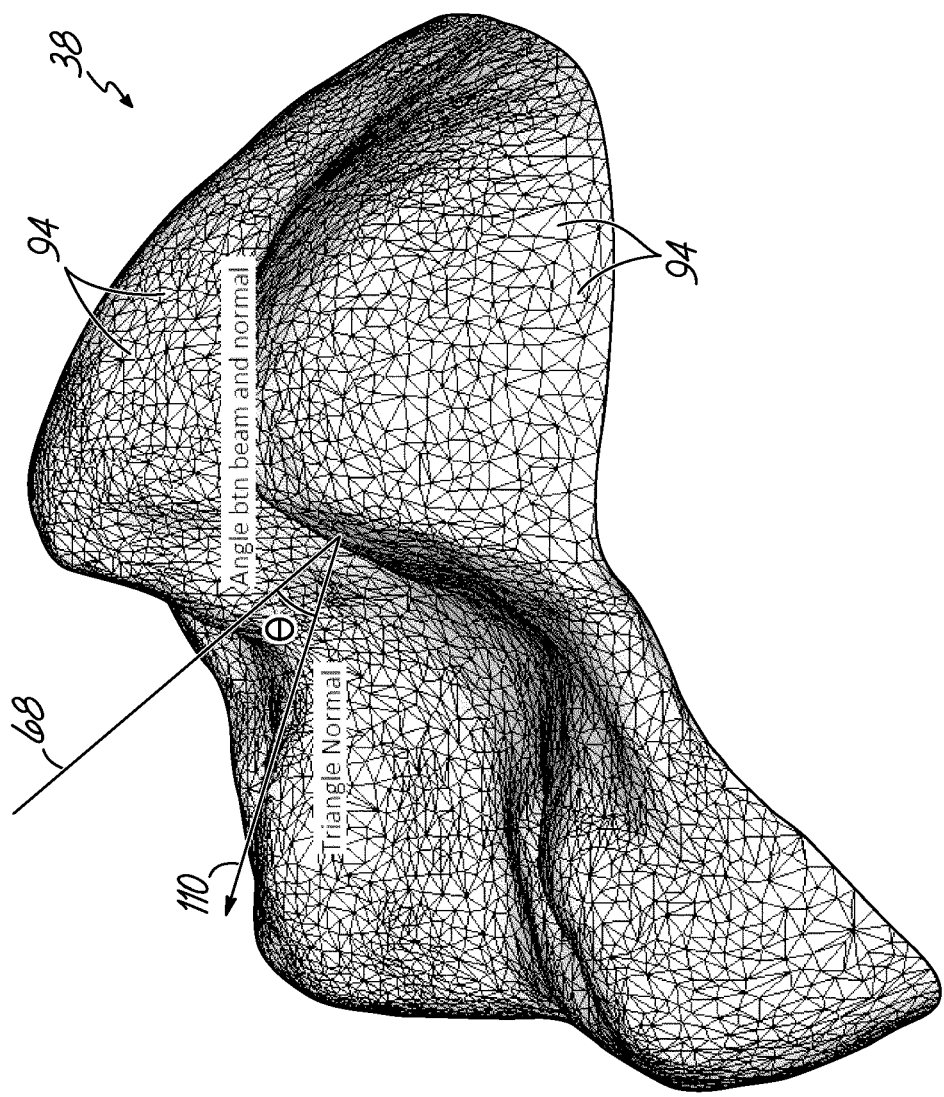
FIG. 6A is a mesh model and calculation according to one embodiment of the invention.

With reference to FIGS. 5 and 6A, at 106, a normal vector 110 for each tile 94 in the mesh of the 3-D model 38 is calculated. The 3-D model 38 may include the remeshed model 92 shown in FIG. 4C. However, other models, for example, models 82 and 84 may be used. The normal vector calculation occurs prior to marking the aligner 10 with an object. As such, calculation of the normal vector 110 may occur during the design of the 3-D model 38 of each aligner 10 in the computer 32 or following manufacturing of the aligners 10 in the manufacturing system 54 and just prior to marking each of the aligners 10 in the marking system 60. When triangular tiles 94 are used, the vectors 110 are calculated at a center of each triangle, for example, as determined according to one of a centroid, a circumcenter, an orthocenter, and an incenter, for example.

In view of known markable orientations between the surface 22 of the aligner 10 and the laser beam 68 during marking, each normal vector 110 on the 3-D model 38 is analyzed. Tiles 94 having normal vectors 110 falling outside of a range of markable orientations for the marking system 60 are disqualified at 108 from later consideration and so are not selected for marking. In this way, physical parameters of the marking system 60 are considered relative to each normal vector 110 during identification of a markable area. By way of example only, disqualification may include calculation of an angle, θ, between the beam 68 from the beam origin 104 to the origin of the normal vector 110 for each tile 94 and the normal vector 110.

Figure 6B:
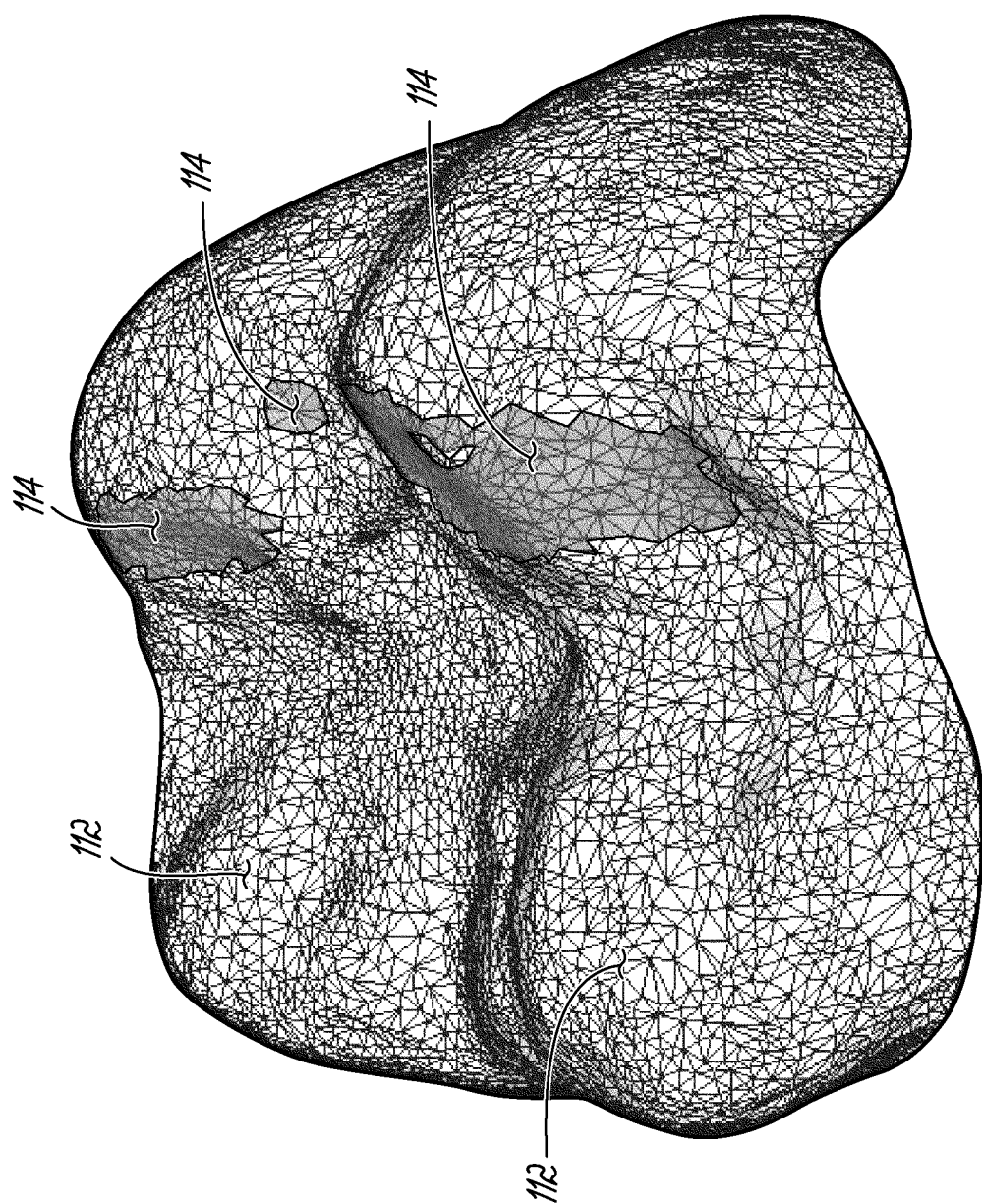
FIG. 6B illustrates a mesh model of an aligner surface according to one embodiment of the invention.

With reference to FIGS. 6A and 6B, tiles 94 having orientations as determined by θ outside of a predetermined band of angles are disqualified. The beam 68 is modeled so that it intercepts an origin of the normal vector 110 of each tile 94, as shown in FIG. 6A. For example, θ's outside of a range of −10° to +10° around the laser beam 68 may be disqualified. By way of further example only, tiles 94 outside of the range may be from −20° to +20°, −30° to +30°, or −40° to +40° may be disqualified. Each of these ranges define a cone of reachable orientations about the laser beam 68 at which a legible mark is producible. However, other ranges may include from −20° to −10° and +10° to +20°. Thus, the range of usable θ's does not need to include alignment between the laser beam 68 and the vector 110 (i.e., θ equal to zero). The ranges of markable orientations may produce predetermined bands of angles that are optimum for marking the aligner 10. The tiles 94 outside of these ranges are disqualified. The predetermined range of θ may depend upon the material of the aligner 10 and the type of laser utilized and may depend specifically upon absorption of the laser light in the material across a range of incident angles. Disqualification at 108 may be based solely on physical parameters of the marking system 60 and the aligner 10. The method 100 further considers tiles 94 having normal vectors that are within the specified range.

Collectively, by way of example only, the disqualified tiles may include all the surfaces shown in unshaded areas 112 in FIG. 6B. In the exemplary embodiment shown, depending on the possible physical orientations of the laser 62, disqualification may eliminate the labial-facing and lingual-facing surfaces of the aligner 10 from being markable because the normal vectors 110 for these surfaces may be almost parallel to a working surface of the stage 64, and thus the vectors 110 at each tile 94 in these areas are nearly perpendicular to the beam 68.

In that regard, in the exemplary embodiment shown in FIG. 6B, the marking system 60 is not capable of orienting the laser 62 so that the beam 68 properly impinges on tiles 94 other than those indicated by shaded surfaces or patches 114. The non-disqualified tiles forming the virtual shaded surfaces 114 are connected. The tiles 94 touch along a side or at a vertex. All other surfaces are disqualified during the method 100 at 108 in FIG. 5 and described above. Although not shown, it is also possible that no tiles are disqualified for marking. That may be the case where the marking system 60 is capable of reorienting the laser 62 relative to aligner 10 to cover all vectors 110. The range of Θ in this case may be from nearly +90° to nearly −90°. The 3-D model 38 may include a plurality of separate surfaces 114, each of which is further analyzed and refined at 120.

Figure 7:
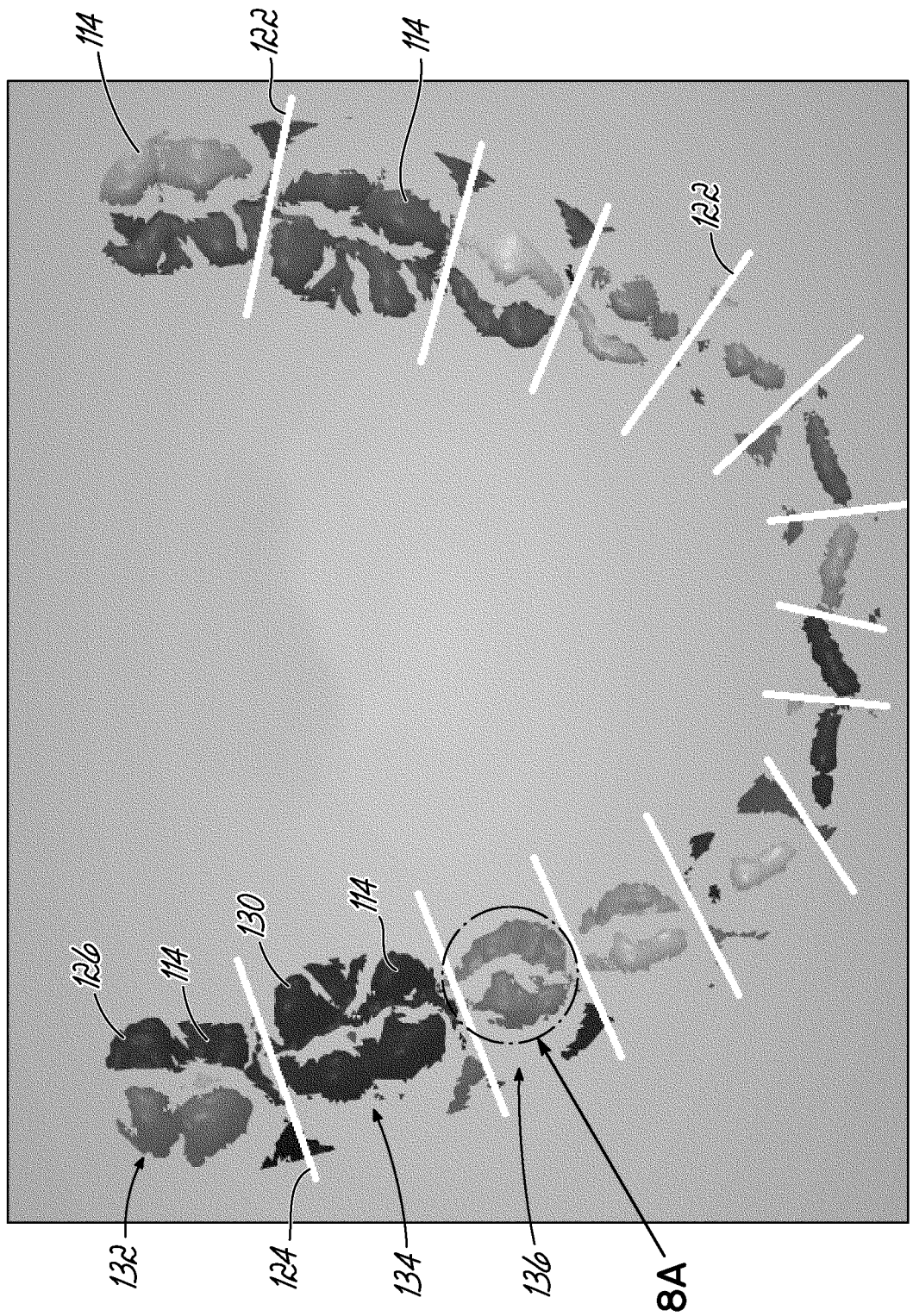
FIG. 7 is a plurality of patches on a model of an aligner surface according to one embodiment of the invention.

With reference to FIGS. 5 and 7, an exemplary set of shaded surfaces 114 for the 3-D model 38 is shown. The patches 114 shown are produced by tiles 94 that are oriented with θ's (shown in FIG. 6A) at or within +−40° relative to a virtual calculation of the orientation between the laser beam 68 and the normal vector 110 to the tile 94. This corresponds to the laser beam 68 in its physical orientation relative to the aligner 10 in the system 60. At 120, the patches 114 are refined to enable identification of patches of markable tiles. These patches then form a pool of possible markable areas. Patch identification may include identifying and virtually removing connections between tiles 94 that touch at a single point or edge. In this manner, large patches 114 that include one or more adjacent tiles 94 connected at a single point or edge may be separated into two or more smaller patches. The smaller patches are formed of tiles 94 within the range of possible θ's. An example of this is shown in FIGS. 8A and 8B, described below.

At 120, and with reference to FIG. 7, the patches 114 may be separated by estimating an interproximal region 122 between adjacent patches 114. For example, an interproximal region 124 is identified to separate surfaces 126 and 130, particularly if they are connected. These areas then more closely approximate occlusal surfaces of separate teeth, for example, the surface 132 and the surface 134 represent separate occlusal surfaces of neighboring molars. One or more surfaces identified is then further analyzed and refined at 120.

Figure 8A:
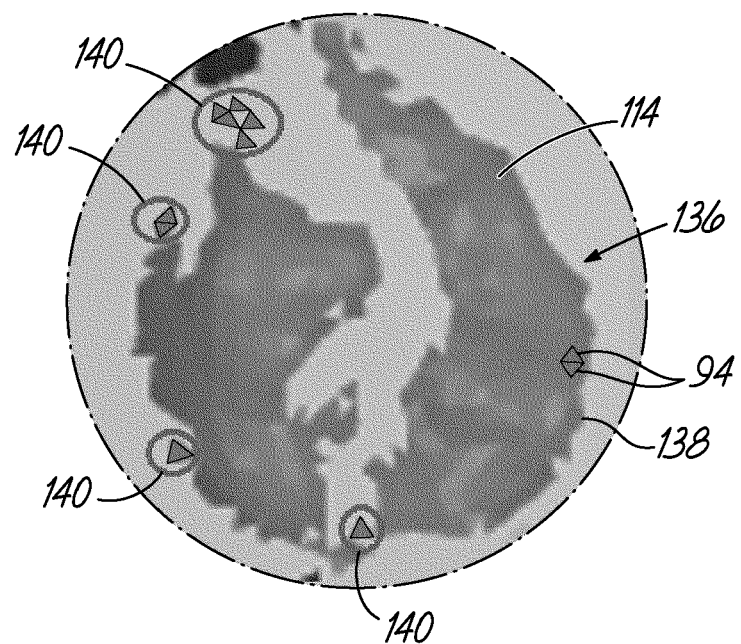
FIG. 8A is an enlarged view of an encircled area 8A shown in FIG. 7.
Figure 8B:
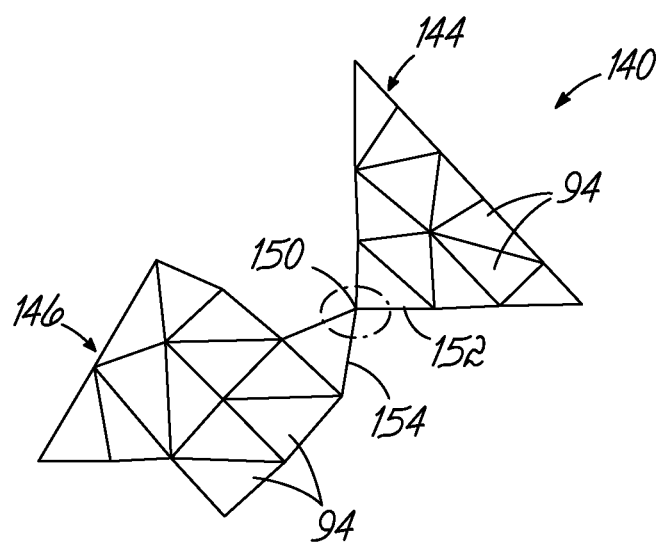
FIG. 8B is a schematic view illustrating patch refinement according to one embodiment of the invention.

With reference now to FIGS. 7 and 8A, once separated by the interproximal region (e.g., 122, 124 in FIG. 7), the patch 136 may be further refined. As shown in FIG. 8A, all tiles 94 of the patch 136 are touching at a vertex or along a side. Thus, an initial boundary is defined by the outer-most tiles 94 of patch 136. From FIG. 8A, it may be observed that narrow portions in which adjacent tiles 94 touch one another only at a vertex form an initial boundary of the collection of tiles that prevents the entirety of the patch 136 from being usable. The initial boundary is therefore further refined to remove unusable tiles and to separate large patches into smaller but more markable areas.

To that end, a boundary 138 is determined by identifying connections between tiles that consist of a single point connection to one of its adjacent neighbor tiles. As shown, the encircled areas 140 in FIG. 8A represent tiles 94 that are single-point connected to a nearest neighbor tile. Exemplary single point connected surfaces 140 are enlarged and shown in FIG. 8B. As shown, the surface 140 may be two regions 144 and 146 of tiles 94 connected at vertex 150. That is, tile 152 and tile 154 meet at vertex 150. Because single-point connections, like the connection 150, do not result in a single surface suitable for marking, these connections are eliminated. Thus, the single patch 114, shown in FIG. 8B, is separated into two smaller patches even though the region 144 is connected to region 146. Each smaller patch is defined by its own boundary 138.

Figure 9A:
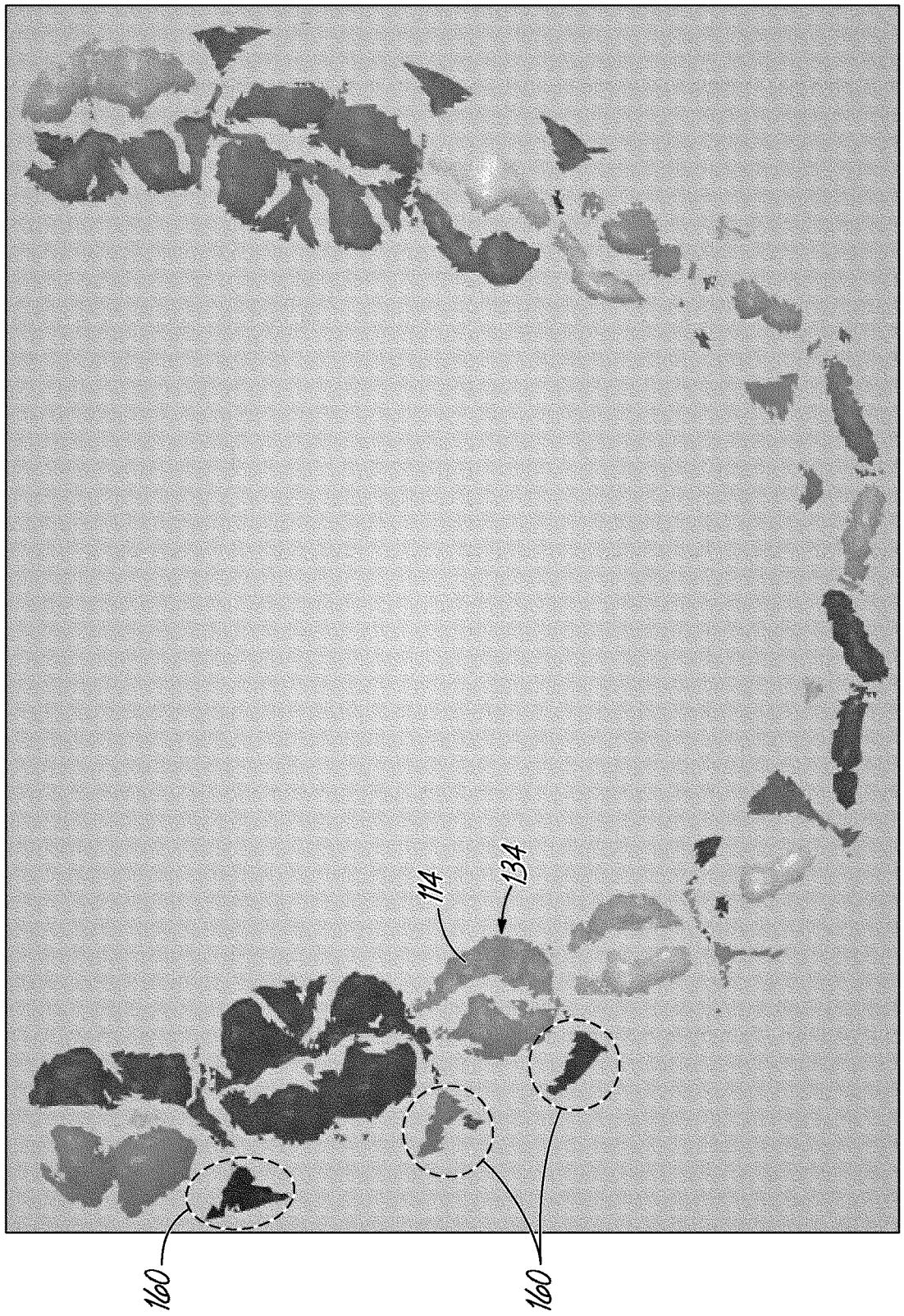
FIGS. 9A and 9B are before and after, respectively, refinement of the plurality of patches shown in FIG. 6B according to one embodiment of the invention.
Figure 9B:
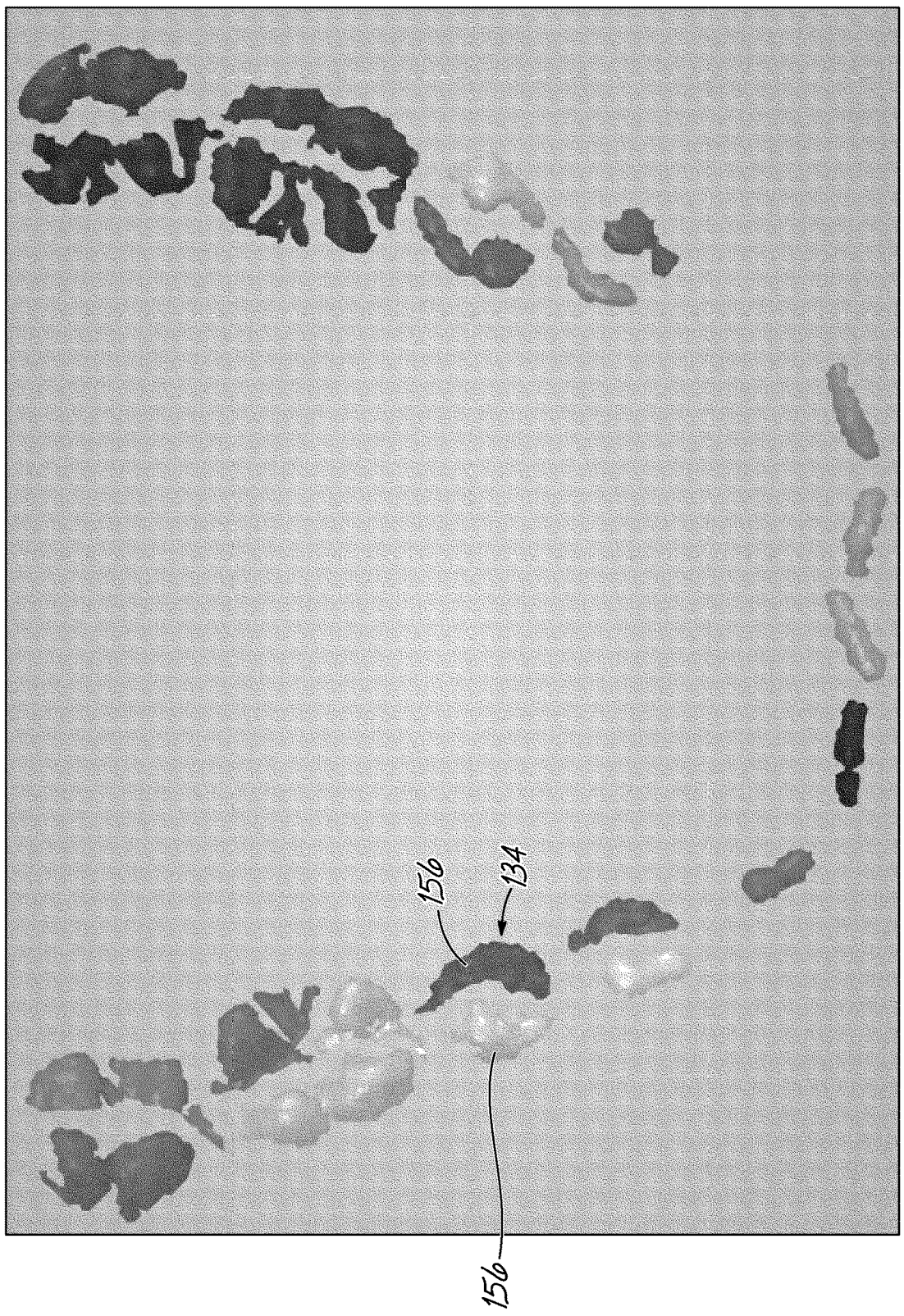

In FIGS. 9A and 9B, the result of refinement is shown. FIG. 9A represents the patches 114 before refinement, and FIG. 9B represents the patches 114 after refinement. Referring to the surface 134 as between FIG. 9A and FIG. 9B, in FIG. 9A, the patch 134 is defined by a single boundary 138. In FIG. 9B, the patch 134 is split into two unconnected patches, which are referred to as patches 156 and are shown in different shading. The other patches 114 shown in FIG. 9A are similarly refined. Note that areas (e.g., areas 160) that are produced based on surfaces imaged from the patient's gingiva are eliminated, because aligners 10 manufactured do not extend onto the patient's gingiva.

Figure 10:
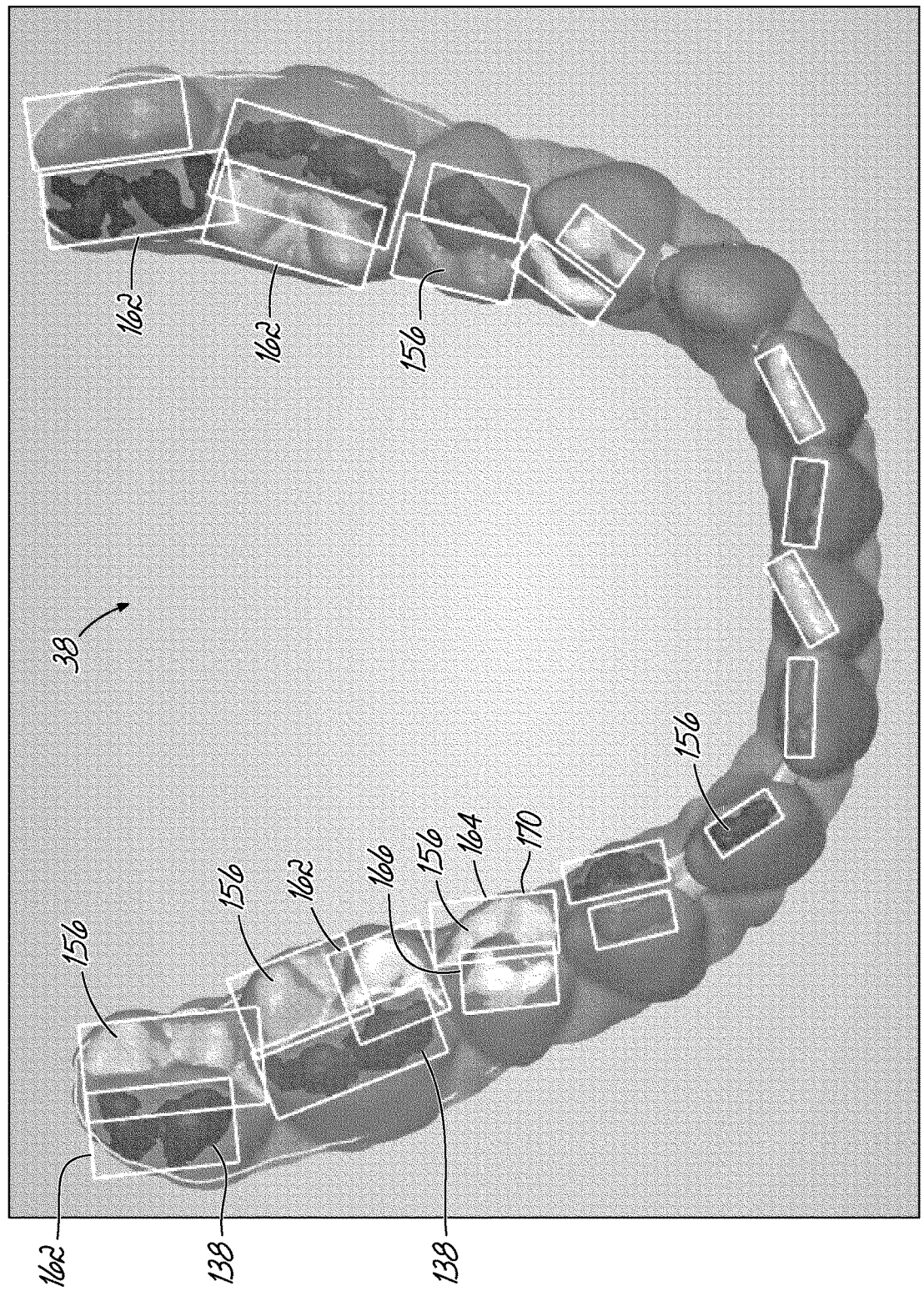
FIGS. 10 and 10A illustrate orientation rectangle construction in a 3-D model.
Figure 10A:
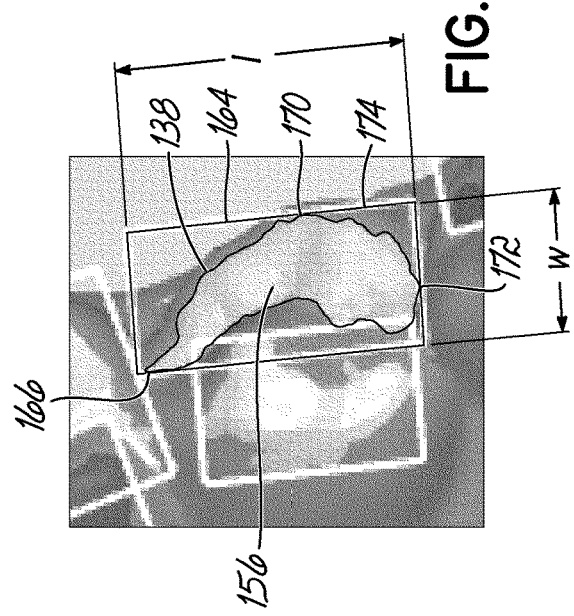

Referring to FIGS. 5 and 10, for each patch 156, a orientation rectangle 162 is calculated at 168. Each orientation rectangle 162 is rectangular with width and length dimensions determined by the boundary 138 (i.e., outermost non-disqualified tiles 94) of the patch 156. The orientation rectangle 162 therefore encompasses the respective patch 156. For example, for the orientation rectangle 164 in FIG. 10A, the width dimension w is determined by tiles 94 at locations 166 and 170 on the boundary 138. Likewise, the length dimension l is determined by tiles 94 at locations 166 and 172 on the boundary 138. Each orientation rectangle 162 then defines rectangle with dimensions w by l in a plane 174.

The outermost dimensions of the boundary 138 of each patch 156 determine both the size, location, and orientation of the respective orientation rectangle 162.

With reference to FIG. 10, each orientation rectangle 162 may therefore be oriented generally in the mesial-distal direction that aligns a long axis of the orientation rectangle 162 with an arch of the aligner 10, as shown. Alternatively, the orientation rectangle 162 may be oriented in other relationships with the teeth, such as in a radial or labial lingual direction. Embodiments of the invention are not limited to the relative orientation between the aligner 10 and the orientation rectangle 162.

Figure 11A:
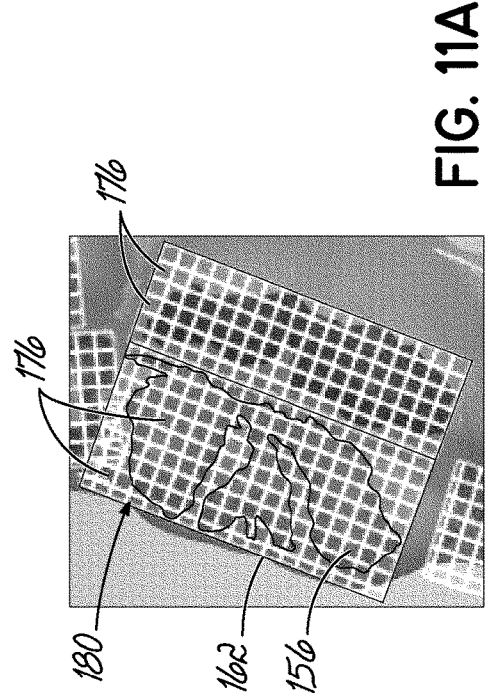
FIGS. 11 and 11A illustrate application of a grid to the orientation rectangle of FIG. 10.
Figure 11:
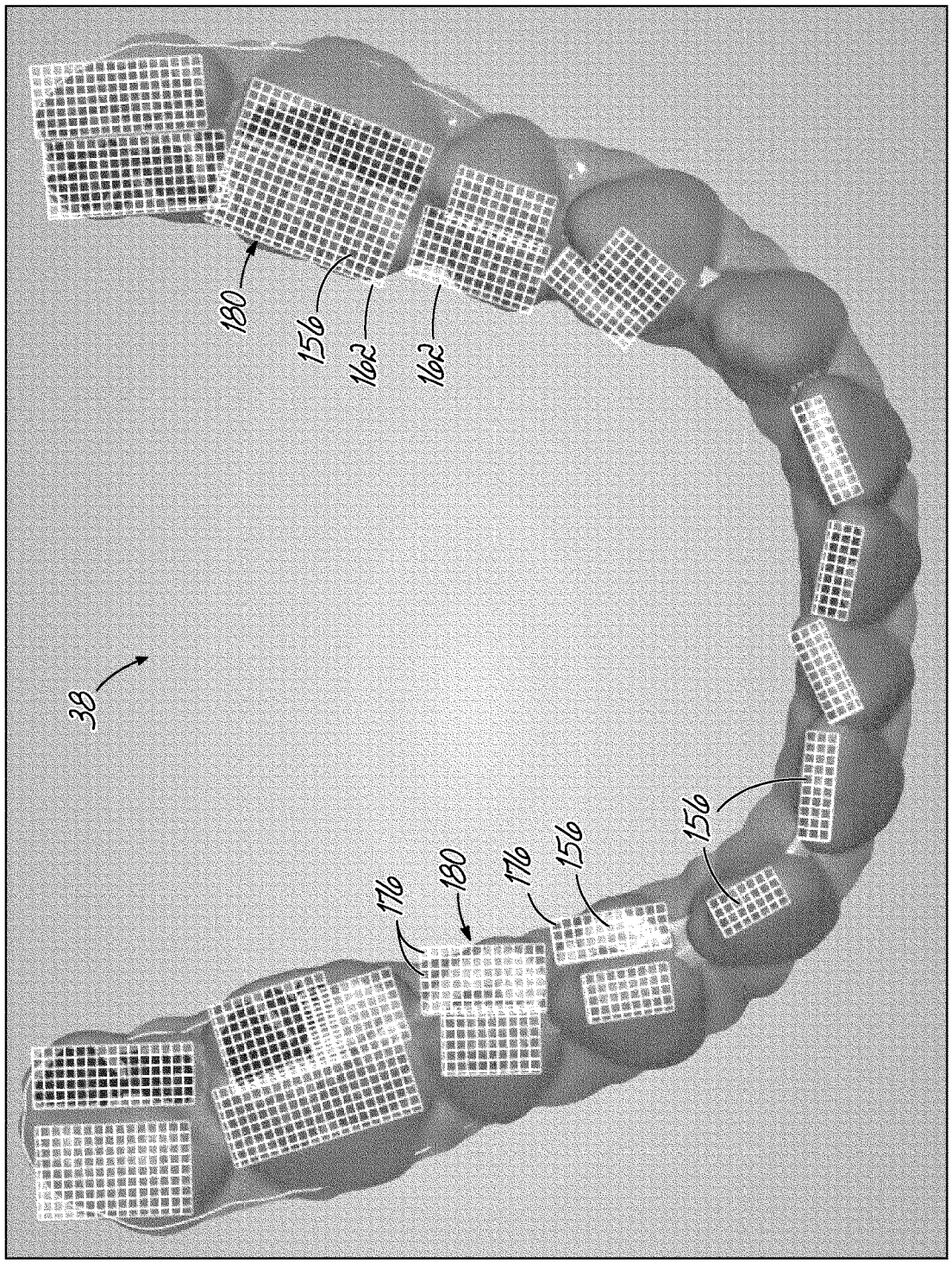

With reference to FIGS. 5 and 11, in one embodiment, during or after each orientation rectangle 162 is constructed and oriented at 168, each is subdivided into cells 176 to form a grid 180 at 182. The scale of each cell 176 of the grid 180 is a predetermined dimension, for example, 1 mm by 1 mm or fractions of a millimeter though embodiments of the invention are not limited to any particular fixed dimension. As shown, the grid 180 forms cells 176 that are square, though other dimensions and cell shapes may be used. As shown best in FIG. 11A, the orientation rectangle 162 may not be equally divisible at the selected cell resolution. In that regard, each orientation rectangle 162 may include a row and/or a column of cells that are rectangles rather than squares. It will however be appreciated that each orientation rectangle 162 may be equally divided into equal cells 176. For example, the orientation rectangle 162 may be enlarged in one or both of width and length to lend itself to equal division of cells 176.

Figure 12A:
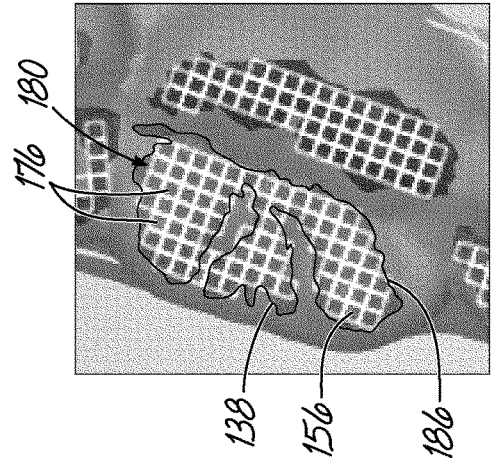
FIGS. 12 and 12A illustrate the 3-D model of FIG. 11 following remarkable area determination.
Figure 12:
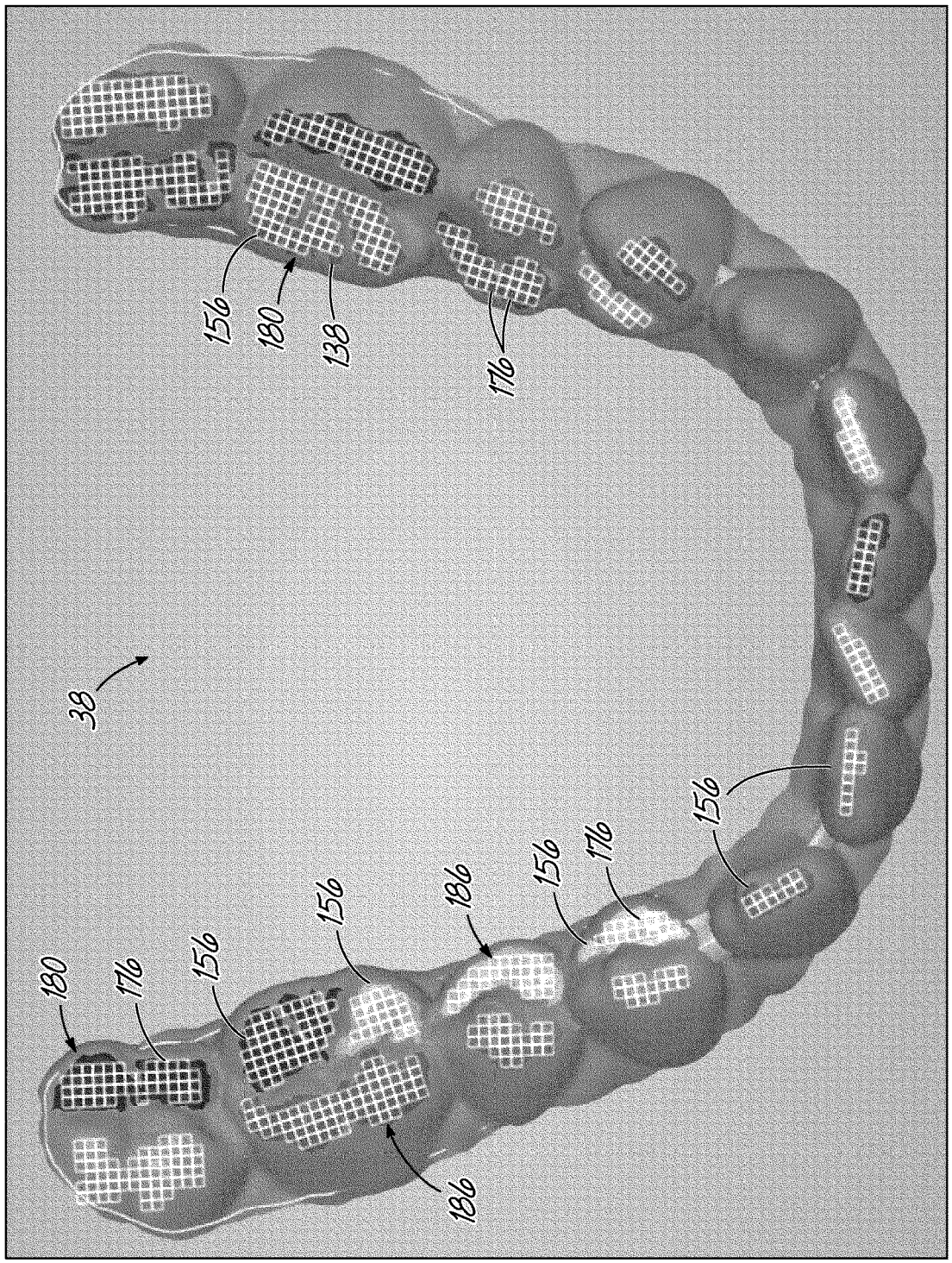

With reference to FIGS. 5 and 12 and 12A, the method 100 analyzes each cell 176 and selects only cells 176 that overlap at least one non-disqualified tile 94 of the patch 156 to form a markable area 186 at 184. The markable area 186 is a collection of cells 176 and/or non-disqualified tiles 94. Often, there are multiple non-disqualified tiles 94 per cell 176 and multiple cells 176 per markable area 186. As shown, the boundary 138 is not traced exactly by the cells 176 in the grid 180. In one embodiment, the overlap between each cell 176 with the non-disqualified tiles 94 must be at least 80% for the cell 176 to be included in the markable area 186. In other words, cells 176 that are not overlapped by at least 80% non-disqualified tiles 94 are not included in the markable area 186. In this way, the boundary 138 is roughly traced by cells 176 that are 80% overlapped with tiles 94 in the patch 156. The percentage overlap between each cell 176 and the non-disqualified tiles 94 of the patch 156 is not limited to 80%. The overlap can be higher or lower and may be user selectable. Further, the usable overlap may be object dependent. In other words, for some objects, such as the logo 200, the overlap of at least 60% produces a satisfactorily legible mark. For other objects, such as the stage number 192, the overlap required may be higher, for example, 80% so that it is more likely that the object 20 is legible. The correspondence between the patch 156 and the cells 176 that make up the markable area 186 may depend on the scale of the grid 102. In that regard, in one embodiment, the scale of the cells 176 may be resized to larger or smaller cells to improve the overlap of the cells 176 near the boundary 138 of the patch 156. As shown, each markable area 186 may have an irregular shape as determined by the cells 176 of the grid 180 and may correspond roughly in shape to the corresponding patch 156.

Figure 13A:
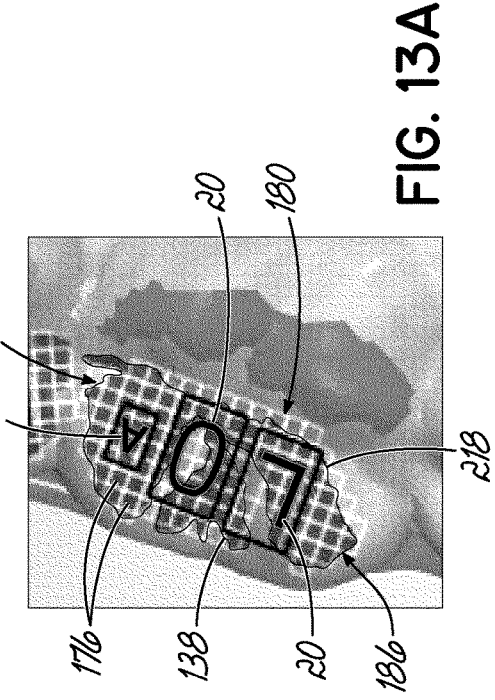
FIGS. 13 and 13A illustrate object placement in the markable areas shown in FIG. 12.
Figure 13:
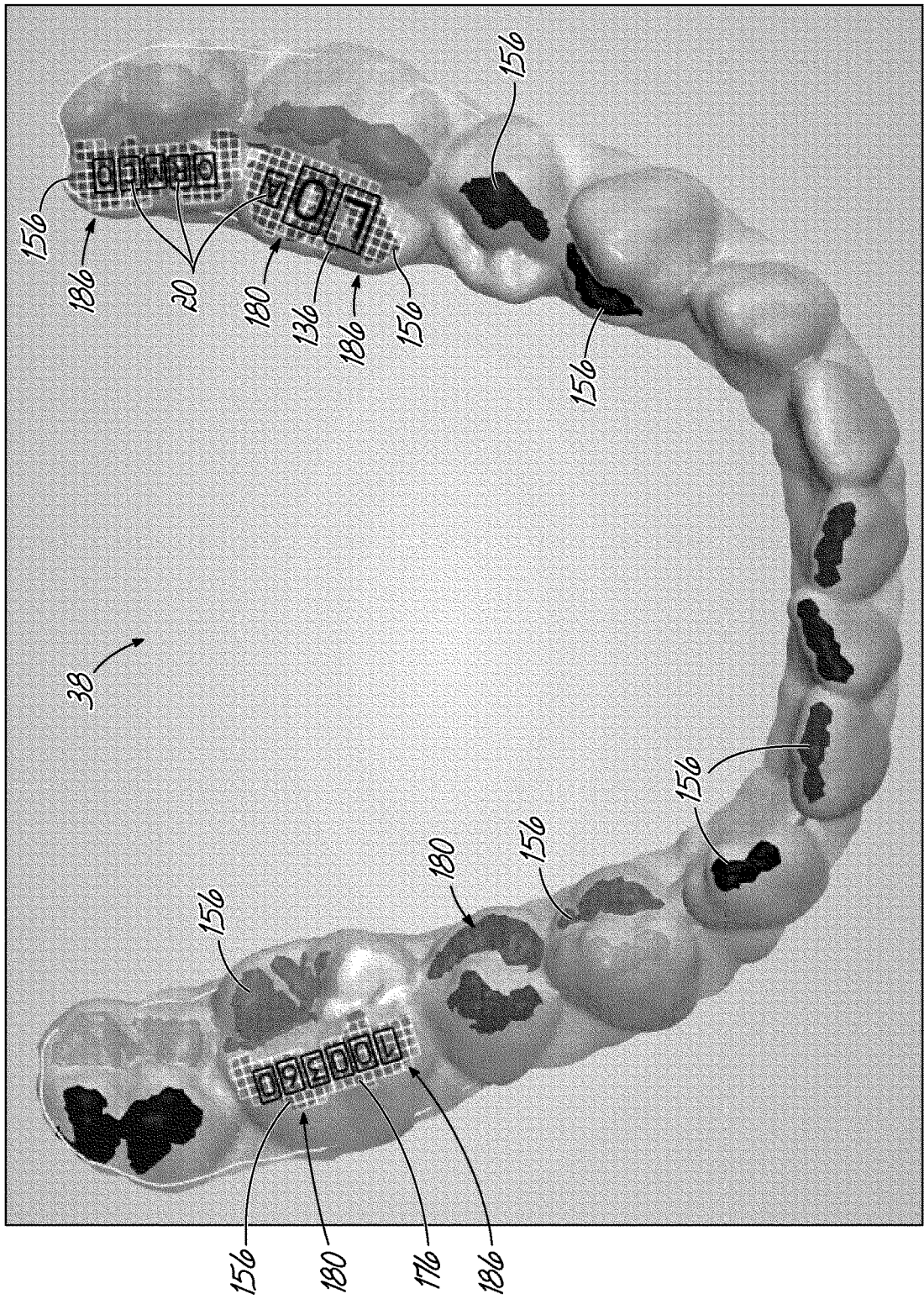
Figure 14:
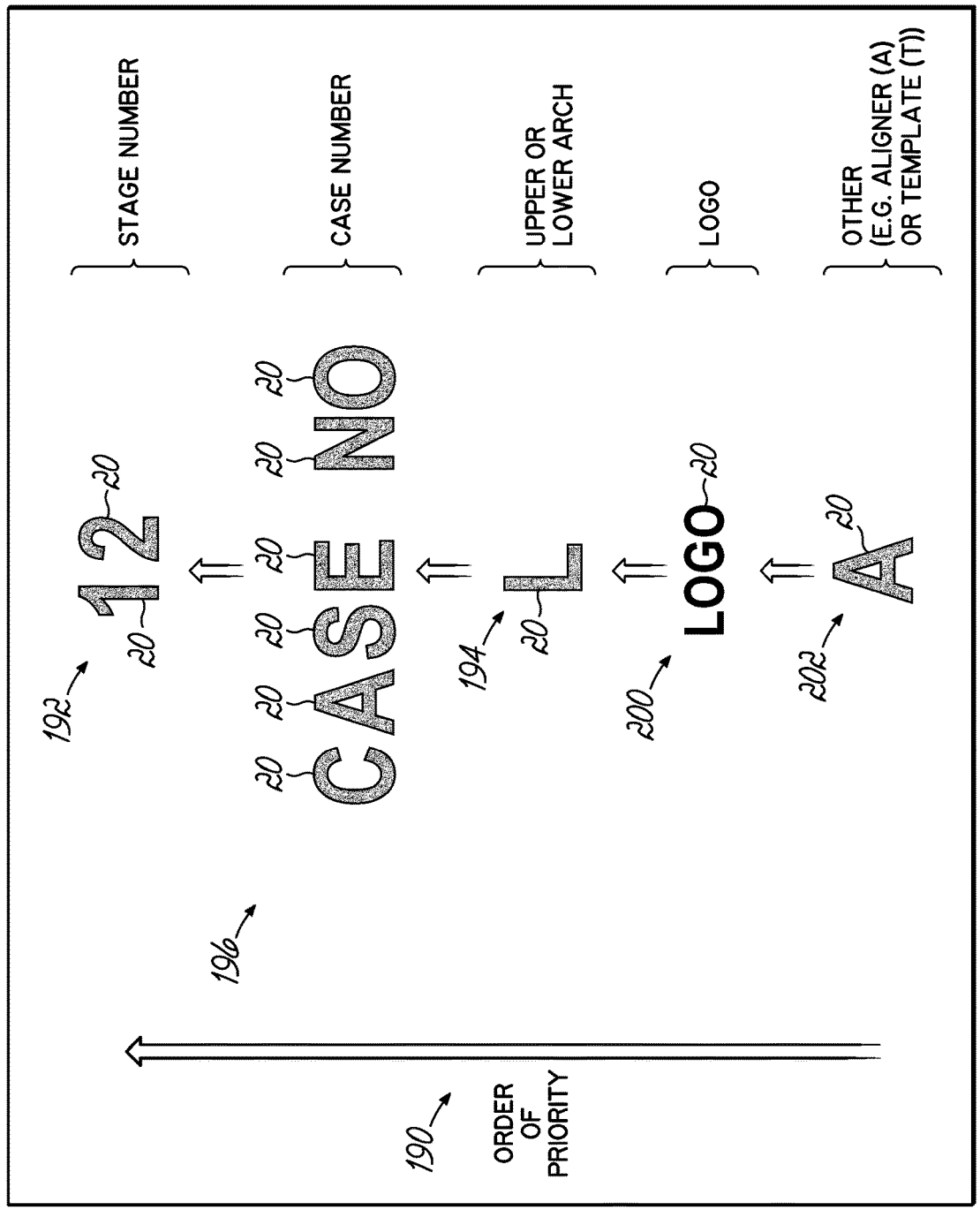
FIG. 14 is a list indicating an order of priority to objects to be marked on each aligner in accordance with one embodiment.

At 188 in FIG. 5 and with reference to FIGS. 13, 13A, and 14, one of the markable areas 186 on the 3-D model 38 may be selected for receiving the object 20. The highest priority object 20 for marking on the aligner 10 is selected. In one embodiment, the method 100 prioritizes the objects 20 in a list of predetermined priority 190 (FIG. 14) before selection and marking.

As is indicated in the list of FIG. 14, higher priority objects 20 are marked before lower priority objects 20. The method 100 starts with the highest priority object 20 and identifies the markable area 186 for that object on the 3-D model 38. Once the markable area 186 is identified for the highest priority object 20, the method 100 associates that object 20 with the markable area 186 in the data for the 3-D model 38 and then selects a next highest priority object 20 to be marked. If the method 100 is unable to identify an area on the 3-D model 38 for the next highest priority object, that object is not assigned and is not marked on the aligner 10. As a result, the aligner 10 is not marked with that object.

In one embodiment of FIG. 14, each object 20 provides information concerning the aligner 10. By way of example only, a collection of separate objects 20 may provide a stage number 192. As shown, the stage number 192 includes two objects 20. Collectively, the two objects 20 indicate a stage of treatment in an orthodontic treatment plan and are an indication of the order in which the aligner 10 is to be used during treatment. In the embodiment shown, the objects 20 that collectively form the stage number 192 are given the highest priority of all the objects 20. In one embodiment, an arch location 194 (i.e., whether the aligner 10 is for the upper "U" or lower arch "L") has the same priority as the stage number 192. Thus, the objects 20 that form the stage number 192 and the arch location 194 are the first objects 20 associated with the 3-D model 38 and may be the only objects marked on the aligner 10.

Additional objects 20 may individually or collectively indicate (i) a case number 196, which may be a collection of six or more separate objects 20, (ii) a logo 200, such as a brand name or manufacturer information, which may also be a collection of objects. In the embodiment shown, the logo 200 is a collection of 4 or more objects 20 "LOGO". And, the object 20 may include (iii) other information 202. Other information 202 may indicate whether the aligner 10 is an aligner ("A") to be used to produce tooth movement, is a template ("T") that may be used to locate attachments on the patient's teeth, or is a retainer ("R") that may be used to maintain tooth positions during or after treatment. By way of example only, when combined with the stage number 192 and the arch location 194, a series of objects 20 may provide the stage number 192, arch location 194, and other information 202, such as U10A. This exemplary series of objects 20 indicates that the aligner 10 is for the upper arch, is number 10, and is an aligner. While the stage number 192 is shown as the object 20 of "1" adjacent the object 20 of "2" in FIG. 14, this is merely exemplary as the stage number 192 may be any collection of objects 20, for example between "0" and "0" and "9" and "9" and, moreover, is not restricted to being two objects. Similarly, each of the case number 196, the arch location 194, and other information 202 shown in FIG. 14 are merely exemplary. Embodiments of the present invention are not limited to the objects 20 shown. In one embodiment, the order of priority from highest to lowest is the stage number 192 and the location 194 followed by (i) to (iii) described above and shown in FIG. 14 with regard to case number 196, Logo 200, and other information 202. However, embodiments of the present invention are not limited to the order shown and described.

At 204 in FIG. 5, in one embodiment, the method 100 prioritizes the available markable areas 186, such as those shown FIG. 13, prior to marking according to the order of priority 190 described above. By this prioritization, the available markable areas 186 are prioritized according to highest probability of providing a legible mark on the aligner 10 to the lowest probability of providing a legible mark on the aligner 10. The prioritization of the markable area 186 may include an analysis of the number of cells 176 that collectively form the markable area 186. In general, the larger the number of cells 176, the more area there is to place the object 20, and producing a legible mark is more likely. Once the markable area 186 is selected, it is removed from the list of available areas for marking for the next priority object.

In one embodiment, the markable areas 186 may be prioritized so that the areas 186 on the 3-D model 38 proximate the patient's molar teeth have the highest priority because these teeth typically have a greater area of occlusally-facing surfaces. In that case, tooth numbers 16, 17, 18, 26, 27, 28, 36, 37, 38, 46, 47, and 48 may include the highest priority markable areas 186 and would be marked first according to the priority list 190 shown in FIG. 14, for example. The markable areas 186 may be further prioritized so that the aligner 10 proximate the premolars have the second highest priority. Premolars may include tooth numbers 14, 15, 24, 25, 34, 35, 44, and 45. Additional markable areas 186 on the 3-D model 38, but not located proximate the molars or proximate the premolars, may be further prioritized to include any unused area on the occlusally-facing surfaces of the teeth in the 3-D model 38. Thus, markable areas 186 located on the anterior teeth may also be considered for marking. Although not shown, the 3-D model 38 may also include virtual auxiliaries (e.g., attachments, bite ramps, artificial ridges etc.) and a markable area may exist on the occlusally-facing surfaces proximate the auxiliary. The markable area 186 may span surfaces that are spaced apart and that are intended to cover different teeth. For example, the markable area 186 may span cavities 14 cover adjacent anterior teeth. The markable area 186 may span more than two cavities and the number of cavities covered and their separation may depend on the object-to-be-marked and whether the object retains its intended meaning as the markable area 186 is spread out.

In one embodiment, rather than prioritizing the markable areas 186 based on the area available, where multiple markable areas 186 are available, the markable areas 186 are matched to the object 20 based on the required area needed for the object 20. This may be based on a set size for the object 20. For example, the case number 196, in which each separate object 20 has a set size, will generally require a greater area for complete marking than either of the stage number 192 or the arch location 194. If markable areas 186 are available for each set of objects 20, the largest markable area 186 may be matched with the case number 192 rather than assigning the stage number 192 in the largest markable area and then assigning the case number 196 to a markable area that is smaller. In this case, when multiple areas are available, prioritization may be based on the markable areas 168 that are available and which best fit each object 20. The objects 20 are then fit within the selected markable area 186.

Figure 15:
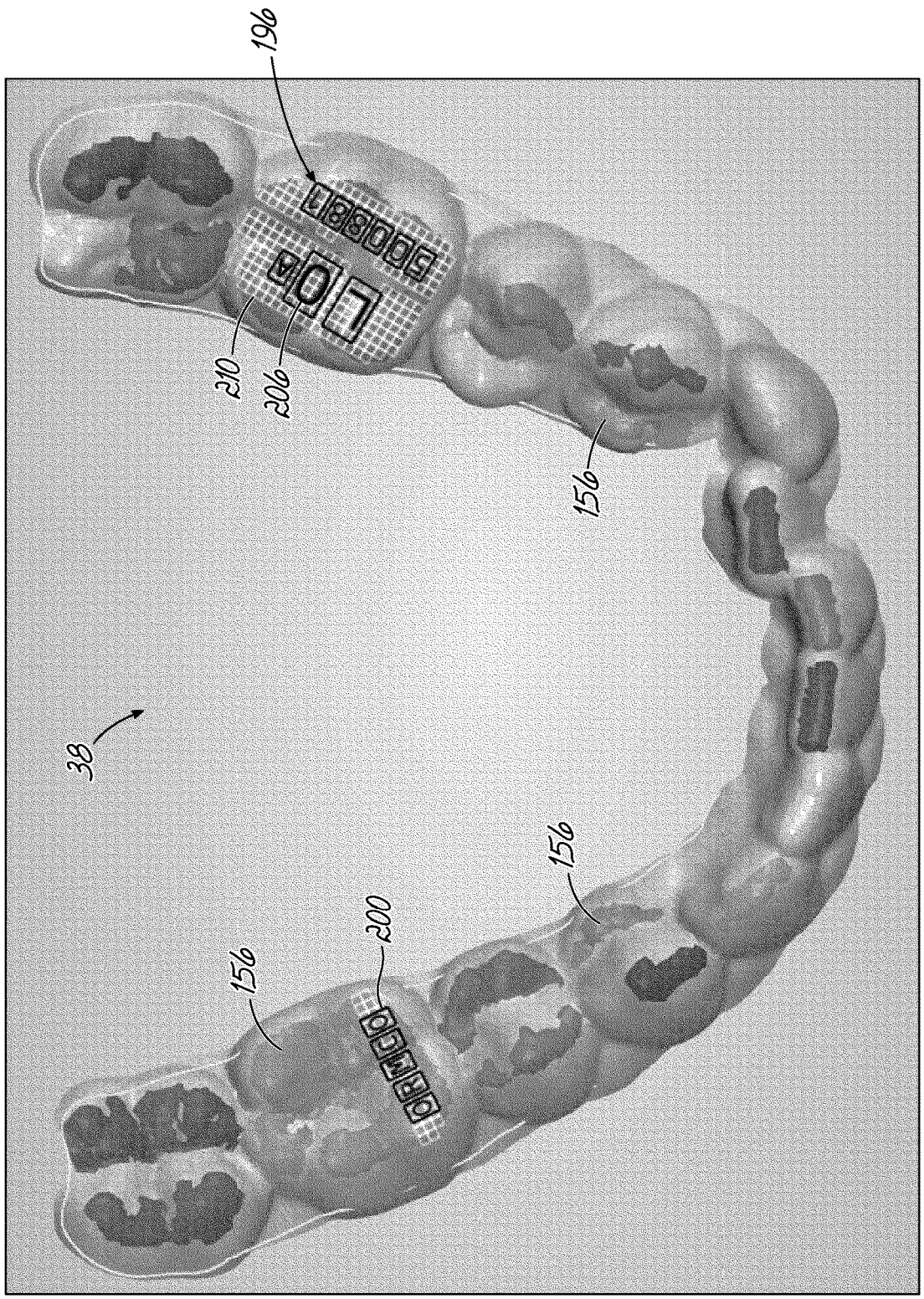
FIG. 15 is an exemplary placement of objects on the 3-D model.
Figure 15A:
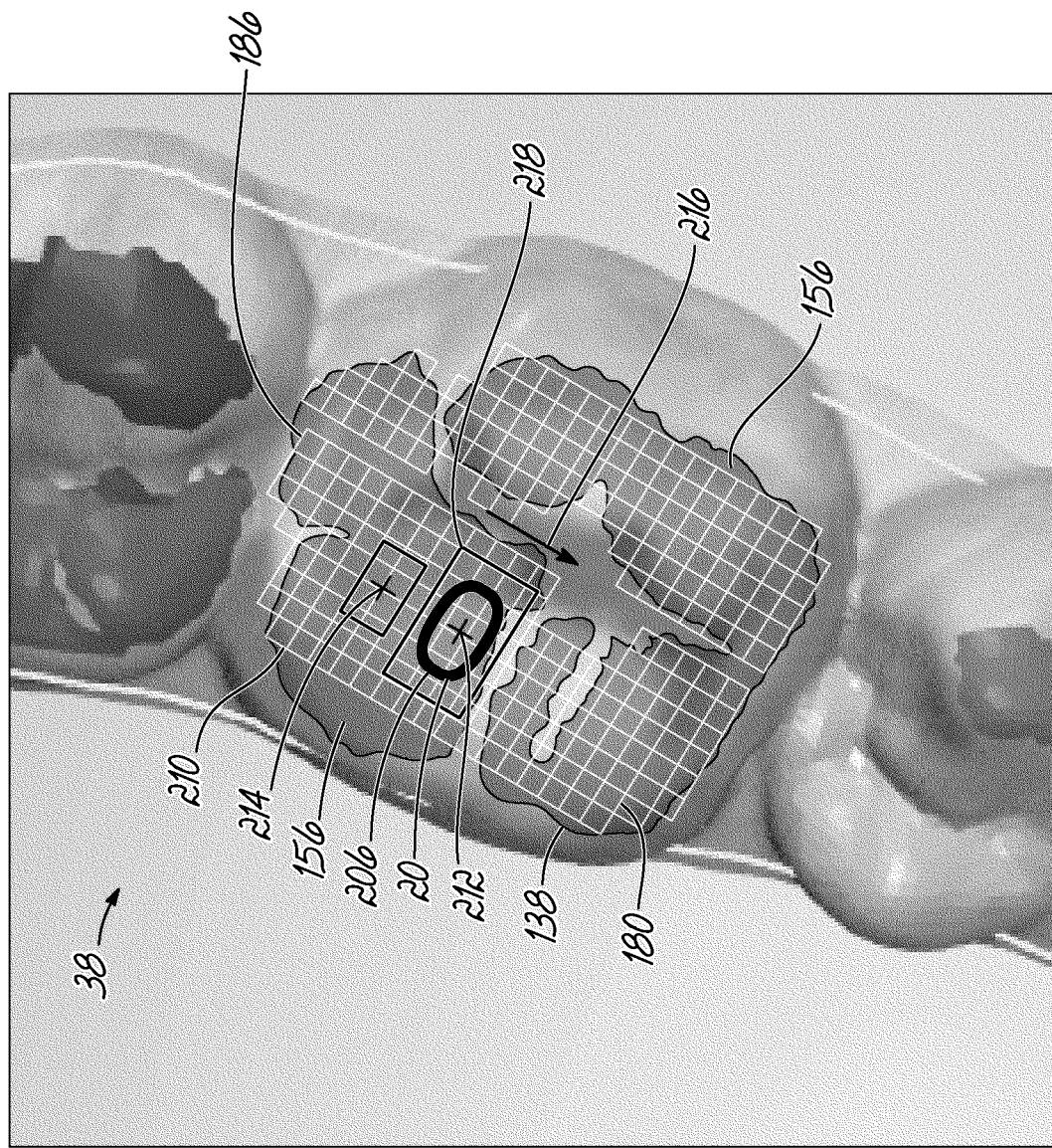
FIG. 15A is an enlarged view of the encircled area 15A.

With reference to FIGS. 5, 15, and 15A, the highest unmarked priority object 20 and the most-favorable markable area 186 are selected, the method 100 checks the fit of the selected object 206 (e.g., stage number "0" in FIG. 15) with the selected markable area 210 at 204. To do so, with reference to FIG. 15A, the method 100 initially places a center 212 of the selected object 206 at a center 214 of the selected markable area 210. The center 214 of the markable area 210 is determined by selecting the cell 176 that is at or adjacent the midpoint of total number of cells 176 that form the length of the markable area 186 and at or adjacent the midpoint of the total number of cells that form the width of the markable area 186.

With reference to FIGS. 13 and 15, each of the objects 20 is surrounded by an object box 218 which defines a length dimension and a width dimension of the object 20. By way of example only, and not limitation, the center 212 may be determined in terms of X and Y coordinates determined by the object box 218. The object box 218 may facilitate proper alignment and/or spacing between objects 20 that are intended to be placed proximate one another and may improve legibility. The object box 218 is shown in the figures as a placement aid, as is described below. For example, the object box 218 may prevent overlap between any two objects 20 but may not be information that is associated with the 3-D model 38, and the object box 218 does not appear on the aligner 10.

Once the selected object 206 is projected with the center 212 on the center 214 into the plane of the selected markable area 210, the overlap of the selected object 206 is evaluated against the cells 176 in the markable area 186 at this location. If the selected object 206 overlaps cells 176 at all locations, the method 100 may shift the selected object 206 relative to the selected markable area 210. By way of example, if any portion of the selected object 206 overlaps a disqualified tile, the method 100 may select another markable area for fitting the selected object 206.

Once an initial fit is achieved, the method 100 may shift the selected object 206. This may be the case when it is desirable to place an additional object 20, such as the remainder of the objects 20 comprising the selected object 206 or the arch location 194, in a meaningful location adjacent the selected object 206 (i.e., stage number 192). The movement of the selected object 206 is shown best in FIG. 15A.

The selected object 206 is shifted in the direction indicated by arrow 216 away from the center 214 of the markable area 210. While a shift is shown that moves the selected object 206 relative to the columns of the grid 180 in the selected markable area 210, embodiments of the invention may shift objects in other directions, such as with respect to the rows of the grid 180 of the selected markable area 210. Further, shifting the object 20 relative to the markable area 186 may include shifting in two directions, for example, along one or more rows and along one or more columns of the markable area 186.

The selected object 206 may be shifted relative to the selected markable area 210 until a portion of the selected object 206 extends beyond the cells 176 of the selected markable area 210. For example, the object 20 may be shifted relative to the markable area 186 by one or more cells 176 towards the anterior teeth, that is in a mesial-distal direction. A portion of the selected object 218 may no longer overlap the cells 176 (i.e., the object 218 overlaps disqualified tiles). When a portion of the object box 218 no longer overlaps cells 176 in the markable area 186. At which point the selected object 206 may be moved in the opposite direction from the arrow 216 to move the selected object 206 back into the selected markable area 210. In this way, the object 20 is moved to an edge of the markable area 186 or the number of cells 176 which overlap with the object 20 is maximized or both.

With reference to FIGS. 5 and 15, in one embodiment, once a specific location in the markable area 210 is identified for the selected object 206, at 220, the positional information for the selected object 206 at the location is calculated. This may include calculation of a Z coordinate for each of the X and Y coordinates of the selected object 206 at the center 212. Thus, the Z coordinate is not calculated until the object 20 is positioned in the markable area 210. The X and Y coordinates from the selected object 206 are aligned in the plane 174 of the orientation rectangle 162, and the Z coordinate of the selected object 206 is determined from the location and orientation of the orientation rectangle 162 or from the location and orientation of a cell 176 in the markable area 168. Each of the X, Y, and Z coordinates may be in the coordinate system defined by the bounding box 80 (FIG. 3). In this way, X, Y, and Z coordinates for the selected object 206 in the selected markable area 210 are defined with respect to the physical space of the marking system 60 (FIG. 3) so that the system 54 can focus the laser beam 68 on the surface of the aligner 10.

Figure 15B:
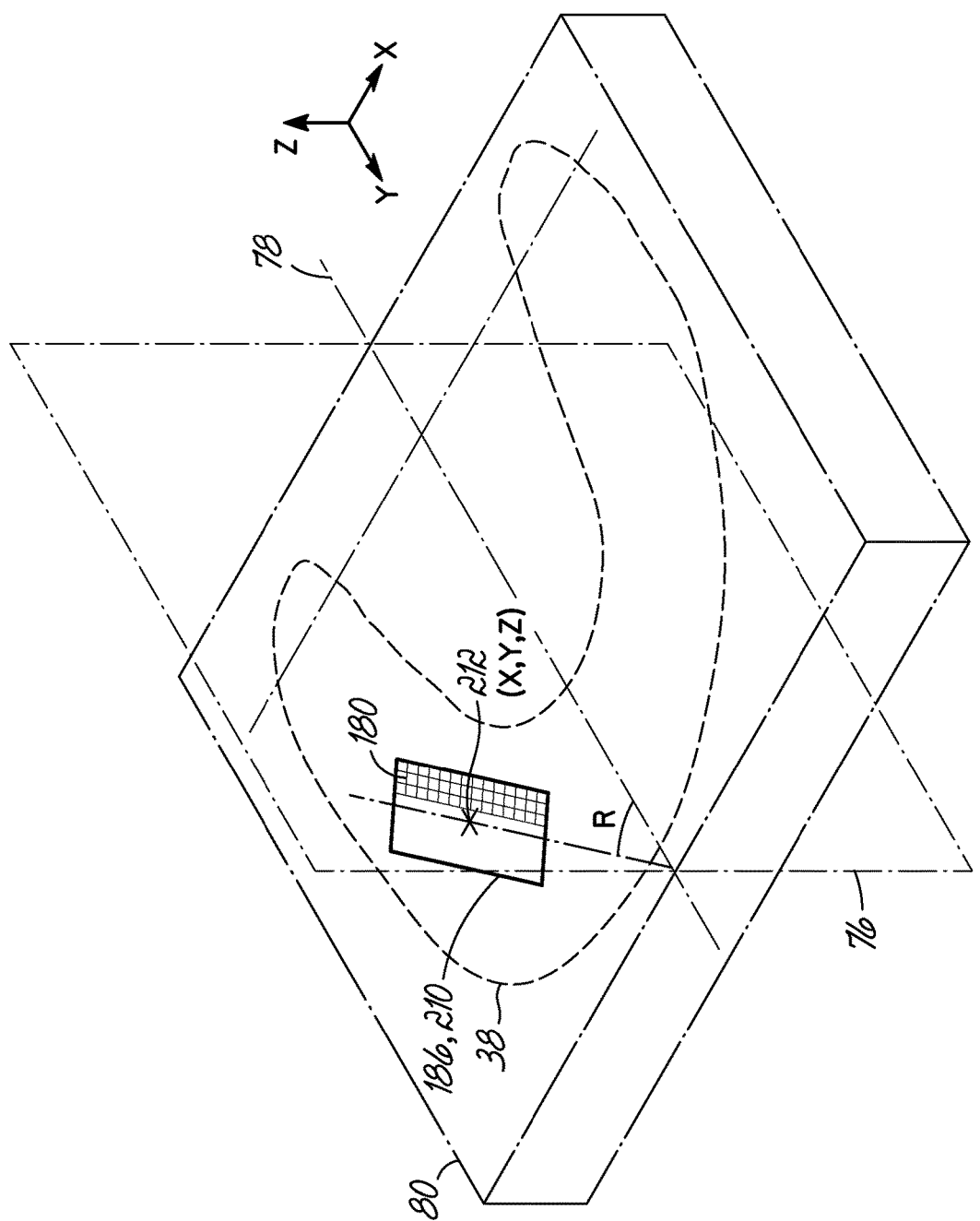
FIG. 15B is a schematic view of a coordinate system according to one embodiment of the invention.

Once the selected object 206 is associated with the selected markable area 210, the orientation of the selected markable area 210 is calculated at 226. With reference to FIG. 15B, this calculation includes a relative orientation between the markable area 186, 210 and the bounding box 80. As an example, the orientation (as an angle R) of the markable area 186 is calculated by constructing a line 222 from the center 212 in the plane of the markable area 186, 210 parallel to the grid 180 and intersecting the plane 76. The coordinates X, Y, Z, and the angle R for the selected object 206 may be associated with data of the 3-D model 38 at 230. Additional calculations may include determination of a normal 224 at the center 212 of the selected object 206 as it resides in a plane defined by the markable area 210. Depending on the marking system 60 and the marking device 62, in particular, this information may facilitate proper orientation of the marking system 60 relative to the markable area 210 to produce a legible mark.

Once the object 206 is placed within the selected markable area 210, the method 100 may iterate beginning at 188 with the next highest priority object 20 (according to the priority in FIG. 14) and with the next available markable area 186. By way of example, with reference to FIGS. 14 and 15C, the arch location 232 (e.g., lower arch or "L") is placed at a meaningful location adjacent the stage number 206 9 ("O"). As shown, the arch location 232 is placed at a reading location to the left of the stage number 206. The arch location 232 is lingually offset by about 1 row from the stage number 206. Thus, it is not necessary for the objects 20 to be aligned along a single row.

By way of further example, the case number 240 consisting of the six objects 20 of "5 0 0 8 8 1" may be fit within the selected area 242. In a similar manner, other information 234 (i.e., aligner or "A") is placed in a meaningful location next to the stage number 206. That location is not limiting as the other information 234 may be placed in any markable area 186 that is sized to receive the "A". The method 100 iterates from 188 to 230 in FIG. 5 until there are no more objects 20 from the priority list 190 to be marked or there are no more available markable areas 186 to receive an object 20.

Figure 15C:
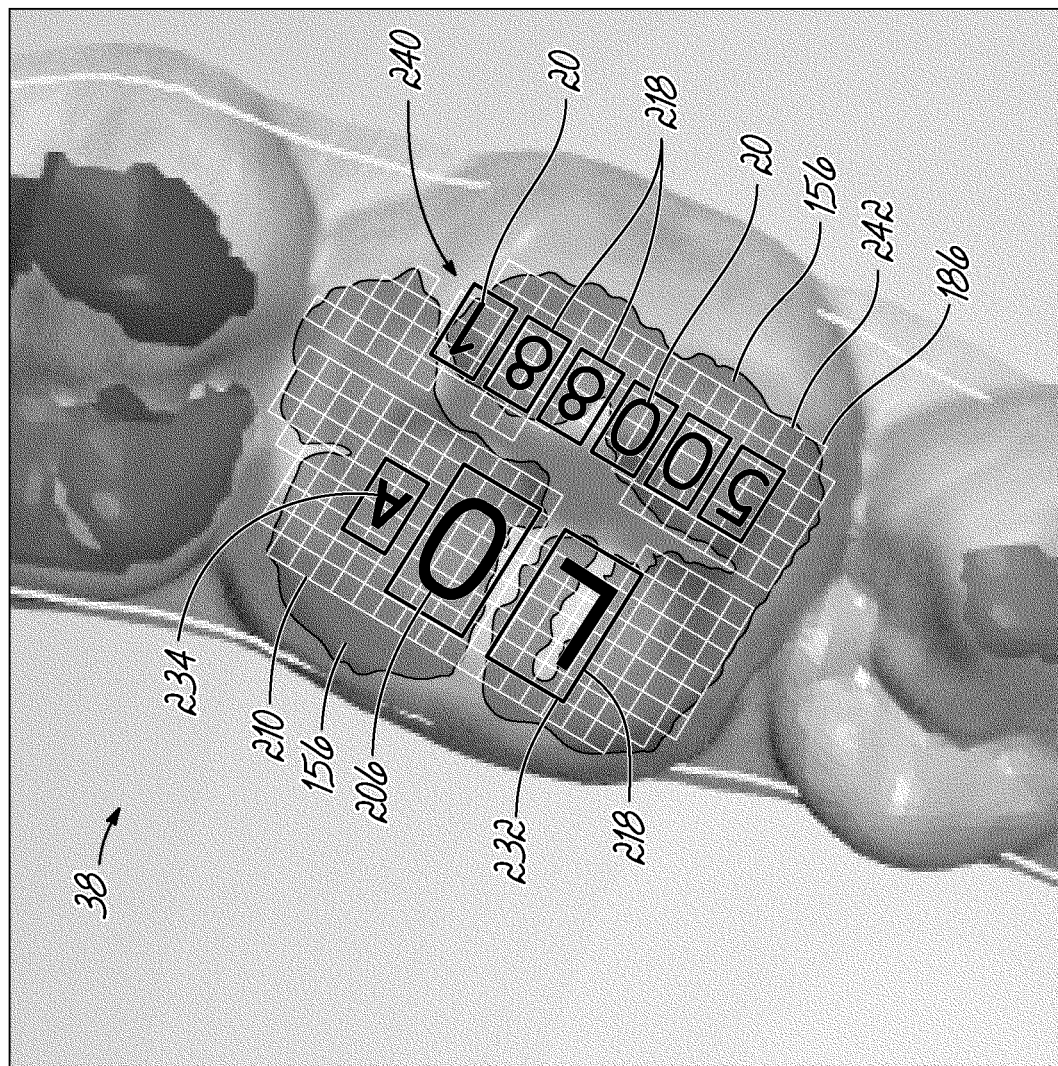
FIG. 15C is an enlarged view of the encircled area 15A depicting additional objects on the 3-D model.

With regard to size, as is shown in FIG. 15C, the objects 20 may include to set dimensions. By way of example only, each of the stage number 192 and the arch location 194 may have a height of 1.96 mm and a width of 1.28 mm and the other information 202 may have a height of 1.61 mm in a width of 0.99 mm. The size of the object 20 may be defined by the object box 218. It will, however, be appreciated that the objects 20 are not limited to any particular size as long as they are legible, preferably with the naked eye, and markable with the beam size and focus available. With the size information, the data for any particular object 20 that is associated with the 3-D model 38 may include: X, Y, Z, R, character height, character width. As an example, with reference to FIG. 15C, the stage number 206 of "0" as it is located in the 3-D model 38 is represented by 11.1089 mm, −18.3236 mm, 11.7288 mm, 127.495°, 1.96 mm, 1.28 mm; the "L" is represented by 9.85637 mm, −19.2796 mm, 11.965 mm, 127.506°, 1.96 mm, 1.28 mm; and the "A" is represented by 12.2325 mm, −17.4394 mm, 11.8007 mm, 127.485°, 1.61 mm, 0.99 mm.

In one embodiment and with reference to FIG. 15, the objects 20 may be arranged in a labial-lingual direction as compared to a mesial-distal direction. The "L O A" shown on the right of FIG. 15 is arranged in a mesial-distal direction. By comparison, the logo 200 on the left side of FIG. 15 is arranged in a labial-lingual direction. Other arrangements are also possible.

Figure 16:
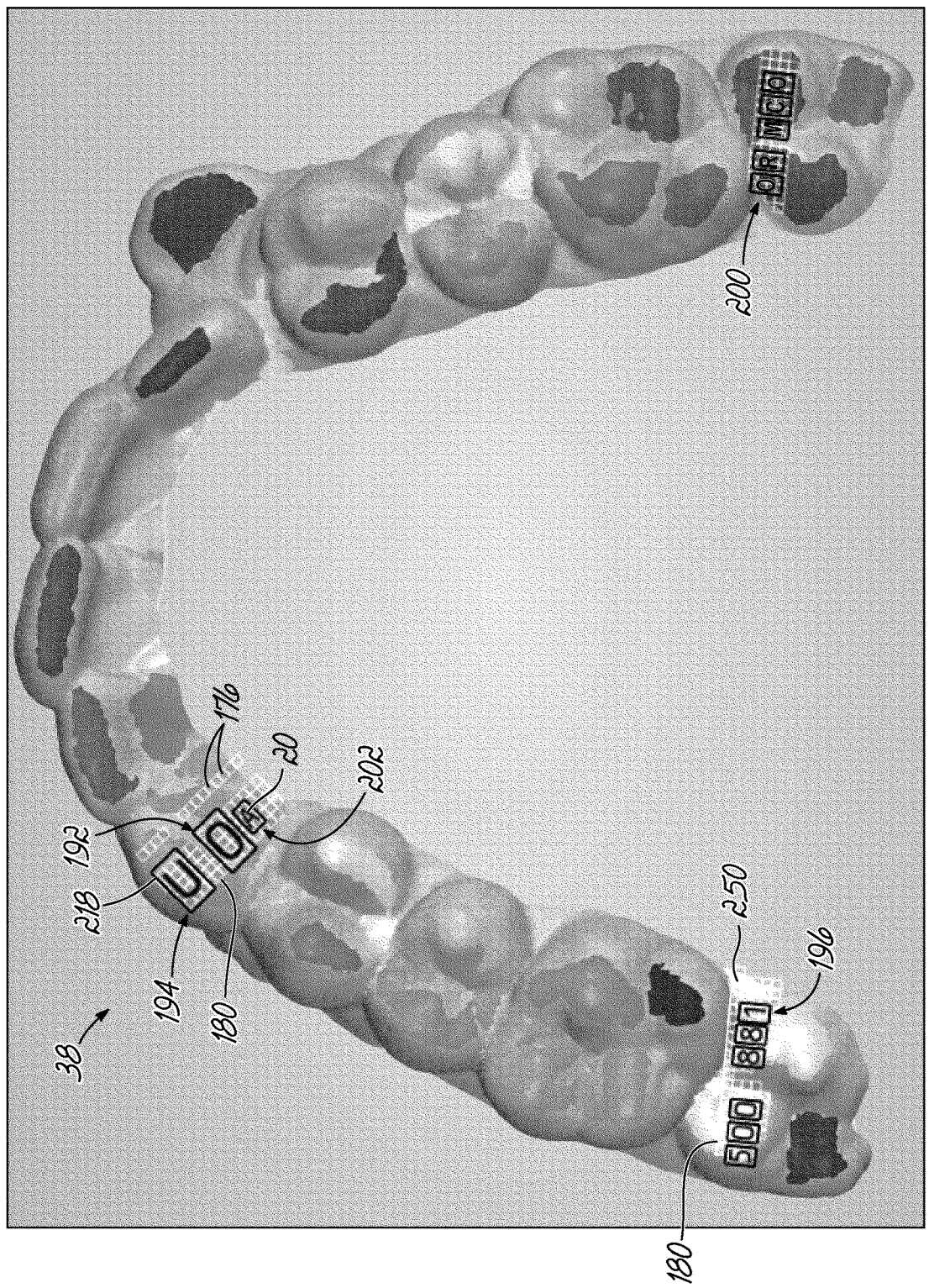
FIG. 16 illustrates object orientation on the 3-D model according to one embodiment of the invention.

And in FIG. 16, in one embodiment, the objects 20 that collectively form one or both of the case number 196 and logo 200, each of which consist of multiple objects, may be split (FIG. 16). The objects 20 for the case number 196 or the logo 200 may be grouped in subsets of objects (e.g., two sets of three objects 20) and then divided on the markable area 250, as shown. Although not shown, the object does not necessarily have to align with the grid 180 of the markable area 186. For example, the object 20 may be angled with respect to the grid 180.

Once at least one object 20 is associated with the markable area 186, data including the object 20 and associated markable area 186 is transmitted to the manufacturing system 54 separately or together with the 3-D model 38. With reference to FIGS. 2 and 3, the system 54 may then calculate an orientation of the laser beam 68 necessary to mark the aligner 10 with the selected object 20. This orientation may require redirecting the laser beam 68 onto a different area of the aligner 10. The controller 66 may translate and tilt one or more mirrors (not shown) to direct the laser beam 68 toward a different portion of the stage 64. With this movement, the laser beam 68 may be optimally focused on the markable area 186 to mark the object 20 in the markable area 186. Optimum focus may therefore be obtained on a per object basis, maximizing the probability of a consistently legible mark.

In a system in which the marking device 62 is movable (indicated by arrow 226 in FIG. 3), the system 54 may reorient that device 62 to reorient the laser beam 68, instead of redirecting just the laser beam 68 while the device 62 is stationary. Reorientation of the marking device 62 may reduce an angular difference between the beam 68 and a normal 224 to the markable area 186. It may then achieve substantial alignment (within 2° or 3°) between the beam 68 and the normal 224 as it is represented on the corresponding aligner 10.

Once the laser beam 68 is oriented, and with reference to FIG. 3, the marking system 60 marks the object 20 on the aligner 10 at a region that corresponds to the markable area 186. In the case of a collection of objects, such as the stage number 192, the controller 66 may reorient the laser beam 68 and then mark the next object 20 for the stage number 192. As an alternative, the controller 66 may move the aligner 10 relative to the laser 62 to the next object location and then mark that object on the aligner 10.

While the present invention has been illustrated by a description of various embodiments and while these embodiments have been described in some detail, it is not the intention of the inventors to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A computer-implemented method for marking an object on a surface of an aligner with a marking device, wherein the surface of the aligner is modeled by a virtual, tessellated surface, the method comprising:
    calculating a normal for each of a plurality of tiles in the tessellated surface;
    disqualifying at least one tile from being selected for marking, wherein disqualifying includes comparing the calculated normal for each of the plurality of tiles with orientations reachable with the marking device;
    for tiles not disqualified, identifying a patch of tiles that produce a markable area;
    selecting an object to be marked;
    calculating a location of the object in the markable area; and
    providing the location of the object to the marking device.

2. The method of claim 1 wherein the marking device is configured to generate a beam and disqualifying includes comparing an angle between each calculated normal and an orientation of the beam from the marking device to an origin of the calculated normal on each tile.

3. The method of claim 2 wherein disqualifying includes disqualifying the at least one tile when the angle is outside of a range of −90° to +90°.

4. The method of claim 1 wherein identifying the patch of tiles includes separating the patch of tiles into at least two smaller patches of tiles, and one of the at least two smaller patches of tiles is the markable area.

5. The method of claim 4 wherein separating includes identifying a first tile in the patch and a second tile in the patch, the first tile and the second tile touching only at a vertex, and after separating, the first tile is included in one of the at least two smaller patches and the second tile is included in another of the at least two smaller patches.

6. The method of claim 1 wherein identifying includes overlapping a rectangular grid consisting of a plurality of cells on the markable area and identifying each cell that is at least 60% overlapped with tiles not disqualified.

7. The method of claim 6 wherein the markable area includes the cells that are at least 80% overlapped with tiles not disqualified.

8. The method of claim 1 wherein selecting the object includes selecting the object from a predetermined prioritized list of objects to be marked.

9. The method of claim 8 wherein the prioritized list of objects includes a stage number and during selecting, the stage number is the first object selected for marking.

10. The method of claim 8 wherein the predetermined prioritized list of objects includes a stage number, a case number, an arch location, a logo, and a type.

11. The method of claim 10 wherein each of the stage number, the case number, and the logo consist of multiple objects each to be marked.

12. The method of claim 11 further including redirecting the laser beam to account for a different position of each object of the multiple objects in the markable area on the aligner and marking the object on the markable area.

13. The method of claim 10 wherein during identifying the patch, no tiles are identified so that at least one of the arch location, the logo, and the type are not marked on the aligner.

14. The method of claim 1 wherein prior to calculating the normal, the method further includes inflating a virtual model of a patient's teeth to provide the virtual, tessellated surface.

15. The method of claim 1 further including fitting the object in the markable area, wherein fitting includes evaluating an overlap between the object and the markable area.

16. The method of claim 15 wherein fitting includes aligning a center of the object with a center of the markable area.

17. The method of claim 16 wherein after aligning, the method further includes shifting the object in a plane of the grid away from the center of the markable area until the object overlaps at least one disqualified tile.

18. A system for marking an object on an aligner with a marking device that produces a beam, wherein the aligner is modeled with a virtual, tessellated surface, the system comprising:
   a processor; and
   a memory including program code; the processor configured by the program code to:
      calculate a normal for each of a plurality of tiles in the tessellated surface;
      disqualify at least one tile from being marked by comparing the calculated normal for each of the plurality of tiles with orientations reachable with the marking device;
      for tiles not disqualified, identify a patch of tiles that produce a markable area;
      select an object to be marked;
      calculate a location of the object in the markable area; and
      provide the location of the object to the marking device.

19. The system of claim 18 further comprising the marking device.

20. The system of claim 18 wherein the processor is configured by the program code to:
   compare an angle between each calculated normal and an orientation of the beam from the marking device to an origin of the calculated normal on each tile.

* * * * *